United States Patent
Chinnock et al.

(10) Patent No.: US 11,255,807 B2
(45) Date of Patent: *Feb. 22, 2022

(54) VERIFYING STRUCTURAL INTEGRITY OF MATERIALS

(71) Applicant: 3M INNOVATIVE PROPERTIES COMPANY, St. Paul, MN (US)

(72) Inventors: Eric M. Chinnock, Chanhassen, MN (US); Christopher R. Yungers, St. Paul, MN (US); Subhalakshmi M. Falknor, Woodbury, MN (US); David H. Redinger, Afton, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 104 days.

This patent is subject to a terminal disclaimer.

(21) Appl. No.: 16/461,423

(22) PCT Filed: Nov. 15, 2017

(86) PCT No.: PCT/US2017/061782
§ 371 (c)(1),
(2) Date: May 16, 2019

(87) PCT Pub. No.: WO2018/093887
PCT Pub. Date: May 24, 2018

(65) Prior Publication Data
US 2019/0346393 A1  Nov. 14, 2019

Related U.S. Application Data

(60) Provisional application No. 62/422,969, filed on Nov. 16, 2016.

(51) Int. Cl.
G01N 27/04 (2006.01)
H01R 4/62 (2006.01)
(Continued)

(52) U.S. Cl.
CPC ............ *G01N 27/20* (2013.01); *G01N 27/041* (2013.01); *H01R 4/62* (2013.01); *F41H 5/0414* (2013.01)

(58) Field of Classification Search
CPC .... G01N 27/20; G01N 27/041; G01N 27/025; G01N 17/02; G01N 27/24; G01N 17/04;
(Continued)

(56) References Cited

U.S. PATENT DOCUMENTS 4,764,970 A   8/1988  Hayashi et al.
4,785,243 A   11/1988 Abramczyk et al.
(Continued)

FOREIGN PATENT DOCUMENTS

CN    101832970 A   9/2010
CN    205003121 U   1/2016
(Continued)

OTHER PUBLICATIONS

Anatychuk, L.I., "Procedure and Equipment for Measuring Parameters of Thermoelectric Generator Modules", Journal of Electronic Materials, vol. 40, No. 5, 2011, pp. 1292-1297.
(Continued)

*Primary Examiner* — Lee E Rodak
(74) *Attorney, Agent, or Firm* — Sriram Srinivasan; Thomas M. Spielbauer

(57) ABSTRACT

A measurement system may include control electronics; an electrical signal source; a plurality of measurement system electrical contacts; at least one feature for repeatably electrically connecting the plurality of measurement system electrical contacts to selected locations of a tested material. The control electronics may be configured to cause the electrical signal source to output an electrical signal; determine a measured voltage in response to the electrical signal using a measurement electrical contact from the plurality of
(Continued)

measurement system electrical contacts. The measurement electrical contact is electrically coupled to the tested material. The control electronics also may be configured to determine whether the tested material includes a crack or other defect based on the measured voltage.

16 Claims, 5 Drawing Sheets

(51) Int. Cl.
*G01N 27/20* (2006.01)
*F41H 5/04* (2006.01)

(58) Field of Classification Search
CPC .......... G01N 19/08; G01N 2021/8816; G01N 2021/8845; G01N 21/8806; G01N 21/95; G01N 2201/0221; G01N 2203/0062; G01N 2203/0064; G01N 2203/0629; G01N 2203/0664; G01N 2291/011; G01N 2291/014; G01N 2291/0238; G01N 2291/0258; G01N 2291/02845; G01N 2291/048; G01N 2291/102; G01N 2291/2634; G01N 27/023; G01N 27/205; G01N 27/283; G01N 29/07; G01N 29/223; G01N 33/388; G01N 33/46; H01R 4/62; F41H 5/0414
See application file for complete search history.

(56) References Cited

U.S. PATENT DOCUMENTS

| | | | | |
|---|---|---|---|---|
| 4,914,378 | A * | 4/1990 | Hayashi | G01N 27/20 324/263 |
| 4,982,158 | A * | 1/1991 | Nakata | G01R 33/10 505/162 |
| 5,258,708 | A | 11/1993 | Sadeghi et al. | |
| 6,150,809 | A | 11/2000 | Tiernan et al. | |
| 6,210,972 | B1 | 4/2001 | Williams et al. | |
| 6,218,846 | B1 | 4/2001 | Ludwig et al. | |
| 6,288,528 | B1 | 9/2001 | Goodstein et al. | |
| 6,476,624 | B1 | 11/2002 | Chuman et al. | |
| 6,802,216 | B2 * | 10/2004 | van Schoor | G01L 1/205 73/159 |
| 6,922,641 | B2 | 7/2005 | Batzinger et al. | |
| 7,161,356 | B1 | 1/2007 | Chien | |
| 7,443,177 | B1 | 10/2008 | Bowler | |
| 7,596,470 | B2 | 9/2009 | Kim | |
| 7,705,589 | B2 | 4/2010 | Kim et al. | |
| 8,059,008 | B2 * | 11/2011 | Marincak | G01N 27/24 340/657 |
| 8,327,306 | B2 | 12/2012 | Oh et al. | |
| 8,552,752 | B2 | 10/2013 | Qiu | |
| 8,624,401 | B2 | 1/2014 | Ishikawa | |
| 8,816,705 | B2 | 8/2014 | Espejord | |
| 9,037,430 | B1 | 5/2015 | Wiggins et al. | |
| 2002/0024346 | A1 | 2/2002 | Ikuta et al. | |
| 2003/0184321 | A1 * | 10/2003 | Hands | G01N 17/02 324/700 |
| 2004/0021461 | A1 | 2/2004 | Goldfine et al. | |
| 2004/0241890 | A1 | 12/2004 | Steele et al. | |
| 2005/0251062 | A1 | 11/2005 | Choi et al. | |
| 2006/0012375 | A1 * | 1/2006 | Kelsey | F41H 5/0435 324/525 |
| 2006/0283262 | A1 | 12/2006 | Smits et al. | |
| 2008/0001608 | A1 | 1/2008 | Saulnier et al. | |
| 2008/0191706 | A1 | 8/2008 | Burnett et al. | |
| 2009/0121727 | A1 | 5/2009 | Lynch et al. | |
| 2009/0192730 | A1 * | 7/2009 | Tada | G01N 27/20 702/38 |
| 2009/0202387 | A1 | 8/2009 | Dlugos, Jr. et al. | |
| 2011/0001498 | A1 * | 1/2011 | Espejord | G01N 27/20 324/693 |
| 2011/0060536 | A1 * | 3/2011 | Feng | G01N 27/041 702/35 |
| 2012/0013483 | A1 | 1/2012 | Jung et al. | |
| 2012/0024346 | A1 | 2/2012 | Bystrom et al. | |
| 2012/0153740 | A1 | 6/2012 | Soar | |
| 2012/0177177 | A1 | 7/2012 | Masters | |
| 2012/0235693 | A1 * | 9/2012 | Feng | G01N 27/20 324/693 |
| 2013/0043888 | A1 * | 2/2013 | Soar | F41J 5/14 324/655 |
| 2013/0307566 | A1 | 11/2013 | Malone et al. | |
| 2014/0062521 | A1 | 3/2014 | Yamada | |
| 2014/0152336 | A1 | 6/2014 | Sasaki et al. | |
| 2014/0354307 | A1 | 12/2014 | Clarke et al. | |
| 2015/0095000 | A1 | 4/2015 | Patil et al. | |
| 2015/0204701 | A1 | 7/2015 | Klicpea | |
| 2015/0308980 | A1 | 10/2015 | Bittar et al. | |
| 2016/0163607 | A1 | 6/2016 | Oh et al. | |
| 2017/0167927 | A1 | 6/2017 | Carkner | |

FOREIGN PATENT DOCUMENTS

| | | |
|---|---|---|
| JP | S56-012544 | 2/1981 |
| JP | S62-047544 | 3/1987 |
| JP | H03-056848 A | 12/1991 |
| JP | H05-288706 A | 2/1993 |
| WO | WO 89/012833 A1 | 12/1989 |
| WO | WO 2007/075243 A1 | 7/2007 |

OTHER PUBLICATIONS

Aselage, T.L., et al., "Large Enhancement of Boron Carbides' Seebeck Coefficients through Vibrational Softening" Physical Review Letters, vol. 81, No. 11, 1998, pp. 2316-2319.

Hartov, Alex, et al. "Using voltage sources as current drivers for electrical impedance tomography", Measurement Science and Technology, vol. 13, 2002, pp. 1425-1430.

International Search Report for PCT International Application No. PCT/US2017/061782, dated Feb. 26, 2018, 3 pages.

Lazarovitch, R., et al., "Experimental crack identification using electrical impedance tomography", NDT&E International, vol. 35, No. 5, pp. 301-316, Jul. 1, 2002.

Paraskevopoulous, I., "Solar Soldier: Virtual Reality Simulations and Guidelines for the Integration of Photovoltaic Technology on the Modern Infantry Soldier", School of Engineering and Design, Brunel University, U.K. 141-154.

Ruan, Tao, "Development of an Automated Impedance Tomography System and its Implementation in Cementitious Materials", Clemson University—TigerPrints, All Dissertations Paper 1756, 2016, pp. 25-49.

Saulnier, Gary J., et al. "A high-precision voltage source for ETI", Physiological Measurement, Institute of Physics Publishing, Bristol, GB, vol. 27, No. 5, May 1, 2006, pp. S221-S236 (XP020105771).

Steinitz, Avital A. "Optimal Camera Placement." 2012 Thesis. (http://www.eecs.berkeley.edu/Pubs/TechRpts/2012/EECS-2012-69.pdf).

Valiant, Leslie G. "The Complexity of Enumeration and Reliability Problems," *SIAM Journal on Computing*, vol. 8, Issue 3, 1979, pp. 410-421.

Zaoui, Abdelhalim "Inverse Problem in Nondestructive Testing Using Arrayed Eddy Current Sensors", Sensors, 2010, vol. 10, p. 8696-8704.

* cited by examiner

VERIFYING STRUCTURAL INTEGRITY OF MATERIALS

CROSS REFERENCE TO RELATED APPLICATIONS

This application is a national stage filing under 35 U.S.C. 371 of PCT/US2017/061782, filed Nov. 15, 2017, which claims the benefit of Provisional Application No. 62/422,969, filed Nov. 16, 2016, the disclosure of which is incorporated by reference in their entirety herein.

TECHNICAL FIELD

The disclosure relates to techniques for verifying structural integrity of conductive or semiconductive materials.

BACKGROUND

Many materials are useful when their mechanical properties remain intact, but less useful when damaged, such as when cracked. Thus, detection of whether these materials are damaged is important. As one example, ceramic body plating is used to protect soldiers, police officers, and other security personnel from projectiles. Ceramic body plating may be useful when undamaged, but may be replaced after being damaged, e.g., after cracking.

X-ray scanning, including X-ray radiography and X-ray computed tomography (CT scanning) may be used to detect cracks or other defects in materials. However, such techniques may utilize large and heavy scanners, which may not be easily portable. Further, X-ray scanning and X-ray CT scanning may be relatively expensive, relatively slow, or both.

SUMMARY

In some examples, the disclosure describes a measurement system for detecting a crack or other defect in a material. The measurement system may include control electronics; an electrical signal source; a plurality of measurement system electrical contacts; at least one feature for repeatably electrically connecting the plurality of measurement system electrical contacts to selected locations of a tested material. The control electronics may be configured to: cause the electrical signal source to output an electrical signal; determine a measured voltage in response to the electrical signal using a measurement electrical contact from the plurality of measurement system electrical contacts. The measurement electrical contact is electrically coupled to the tested material. The control electronics also may be configured to determine whether the tested material includes a crack or other defect based on the measured voltage.

In some examples, the disclosure describes a method for detecting a crack or defect in a material. The method may include coupling a plurality of measurement system electrical contacts of a measurement system to a tested material. The measurement system includes at least one feature for repeatably electrically connecting the plurality of measurement system electrical contacts to selected locations of a tested material. The method also may include causing, by control electronics, an electrical signal source to output an electrical signal. The method further may include determining, by the control electronics, a measured voltage in response to the electrical signal using a measurement electrical contact from the plurality of measurement system electrical contacts; and determining, by the control electronics, whether the tested material includes a crack or other defect based on the measured voltage.

The techniques described herein may provide one or more advantages. For example, using a measurement system in which all electronics are separate from the material being tested may reduce cost associated with the material. As another example, a measurement system that includes at least one feature for repeatably electrically connecting electrical contacts of the measurement system to selected locations of the material being tested may facilitate repeatability of electrical property measurements for the material, which may improve accuracy of determinations of whether the material includes a crack or other defect. Further, a measurement system as described herein may offer improved portability and cost compared to an X-ray radiography or X-ray computed tomography system, while offering sufficient accuracy and detail to enable detection of cracks or other defects in a material being used in the field.

The details of one or more examples are set forth in the accompanying drawings and the description below. Other features, objects, and advantages will be apparent from the description and drawings, and from the claims.

DETAILED DESCRIPTION

Figure 1:
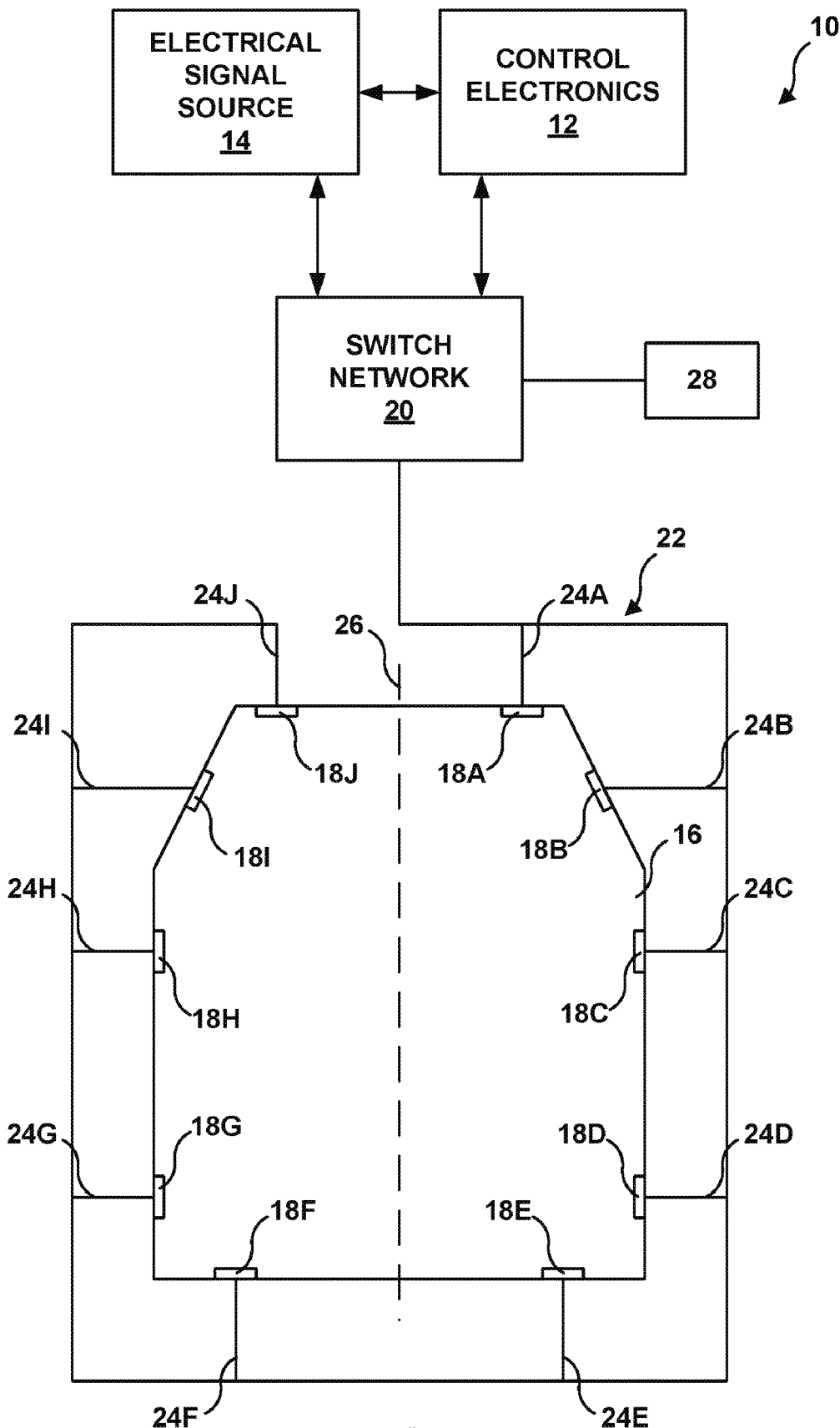
FIG. 1 is a conceptual and schematic block diagram illustrating an example measurement system for determining whether a tested material includes a crack or other defect, in which the measurement system includes at least one feature for repeatably electrically connecting the plurality of measurement system electrical contacts to selected locations of the tested material.

The disclosure describes systems and techniques for verifying structural integrity of a tested material. The techniques may include determining whether the tested material includes a crack or other defect based on a comparison between at least a first measured voltage associated with the material and a second voltage associated with the tested material. The second voltage may be another measured voltage or a control voltage. The measured voltage may be measured using a measurement system that is separate from the tested material. For example, the measurement system may include control electronics, an electrical signal source, and a plurality of measurement system electrical contacts. To facilitate consistent measurements of voltages using the measurement system, the measurement system may include at least one feature for repeatably electrically connecting the plurality of measurement system electrical contacts to selected locations of the tested material. The at least one feature may include, for example, keyed measurement system electrical contacts, a physical configuration of the measurement system electrical contacts, a shape or structural feature of a fixture to which the measurement system electrical contacts are attached, or the like.

The control electronics may determine the first measured voltage by causing the electrical signal source to output an electrical signal and determining a measured voltage in response to the electrical signal using a measurement electrical contact electrically coupled to the tested material. In some examples, the electrical signal source may output the electrical signal to a set drive electrical contacts electrically coupled to the tested material. In other examples, the electrical signal source may output the electrical signal to an inductor proximate to the tested material.

Regardless of whether the electrical signal source outputs the electrical signal to the set of drive electrical contacts or the inductor, the control electronics may determine a voltage using a measurement system electrical contact from the plurality of measurement system electrical contacts. The measurement system electrical contact may be electrically coupled to the tested material, e.g., directly to the tested material or to a material electrical contact of the tested material.

The control electronics may determine whether the tested material includes a crack or other defect based on the measured voltage. For example, the control electronics may utilize the measured voltage and a control voltage to determine whether the material includes a crack or other defect. The control voltage may be associated with the same measurement system electrical contact and have been measured at a time at which it is independently known that the tested material is known to be intact (i.e., without a crack or other defect).

As another example, the control electronics may utilize the measured voltage and a second measured voltage associated with another measurement system electrical contact. The positions of the contact between the first and second measurement electrical contacts and the tested material may be selected to allow meaningful comparisons between the first and second measured voltages. For example, electrical contacts may be positioned on the material based on a symmetry of the material, so that each measured voltage is substantially the same when the material is intact, or both.

Regardless of whether the control electronics utilizes the control voltage or the second measured voltage, the control electronics makes the determination of whether the tested material includes a crack or other defect based on voltages associated with selected locations of the tested material. For example, the control voltage is associated with the same location of the tested material as the measured voltage. The second measured voltage may be associated with a location that is symmetric to the location associated with the first measured location. Because of this, consistently and repeatably electrically coupling the measurement system electrical contacts to selected positions of the tested material facilitates determination of whether the tested material includes a crack or other defect. Further, by utilizing a measurement system separate from the tested material, a single measurement system may be used with multiple tested materials.

Other techniques also may be used to detect cracks in a material. For example, X-ray radiography or X-ray computed tomography (CT) may be used to detect cracks in a material. However, X-ray radiography and X-ray CT utilize relatively large, relatively expensive equipment to perform the crack detection. This may prevent X-ray radiography and X-ray CT from being portable, such as being used to test materials in the environments in which they are used. Moreover, X-ray radiography and X-ray CT may be relatively time consuming. In contrast, the systems and techniques described herein utilize relatively smaller, relatively less expensive equipment.

FIG. 1 is conceptual and schematic diagram block illustrating an example measurement system 10 for determining whether a tested material 16 includes a crack or other defect, in which measurement system 10 includes at least one feature for repeatably electrically connecting the plurality of measurement system electrical contacts 24A-24J to selected locations of tested material 16. Measurement system 10 includes control electronics 12, an electrical signal source 14, a harness 22 that includes a plurality of measurement system electrical contacts 24A-24J (collectively, "measurement system electrical contacts 24"), an optional switch network 20, and an optional reference electrode 28. Tested material 16 includes a plurality of optional material electrical contacts 18A-18J (collectively, "material electrical contacts 18").

Tested material 16 may be any material for which detection of a potential crack or other defect is desired. In some examples, tested material 16 may be an electrically conductive or an electrically semiconductive material. For example, tested material 16 may include a metal, an alloy, a metalloid, a semiconductor, an electrically conductive or semiconductive ceramic, or the like. In some examples, tested material 16 may include a ceramic such as boron carbide ($B_4C$), silicon carbide (SiC), alumina ($Al_2O_3$), composites thereof, or the like.

Tested material 16 may be used in any one of a wide variety of applications. For example, tested material 16 may be a ceramic that has relatively high hardness, a relatively high Young's modulus, a relatively high tensile strength, and may be used in ceramic armor plating. Ceramic armor plating may be used in body armor for military and police personnel, vehicle armor, or the like. Example materials for ceramic armor plating include boron carbide ($B_4C$), silicon carbide (SiC), alumina ($Al_2O_3$), composites thereof, or the like.

Tested material 16 may define any geometry, and the geometry of tested material 16 may be based at least in part on the intended use for tested material 16. For example, ceramic armor plating may have a geometry defined by the surface that the armor plating will be applied to. Example geometries for tested material 16 include, but are not limited to, polygonal solids, such as rectangular solids or solids with more sides.

In some examples, tested material 16 may define a geometry that has a symmetry, i.e., is symmetric. As used herein, a symmetry is a point, line, plane, curve, or manifold, with reference to which a single mathematical operation maps each point of tested material 16 to another point of tested material 16. In the example of FIG. 1, tested material 16 includes a plane of symmetry 26 across which there is mirror symmetry. As described in further detail below, in some examples in which tested material 16 includes a symmetry, control electronics 12 may compare voltages measured using measurement system electrical contacts 24 or pairs of measurement system electrical contacts 24 that are symmetrical with reference to the symmetry, e.g., plane of symmetry 26, to determine whether tested material 16 includes a crack or other defect.

In some examples, tested material 16 may optionally include plurality of material electrical contacts 18. In other examples, tested material 16 may omit plurality of material electrical contacts 18. Plurality of material electrical contacts 18 may improve electrical coupling between tested material 16 and plurality of measurement system electrical contacts 24. Plurality of electrical contacts 18 may include an electrically conductive material, such as, for example, an electrically conductive metal or alloy. Each of plurality of material electrical contacts 18 may be electrically connected to tested material 16 using any suitable type of electrical coupling, including, for example, an electrically conductive adhesive, an electrically conductive solder, embedding material electrical contacts 18 in tested material 16, a dielectric coupling via capacitive coupling, or the like.

In examples in which tested material 16 includes plurality of material electrical contacts 18, each respective material electrical contact may be positioned at a selected location of tested material 16. Material electrical contacts 18 may be attached to any surface of tested material 16. For example, plurality of material electrical contacts 18 may be positioned at locations complementary to positions of plurality of measurement system electrical contacts 24.

The surface to which material electrical contacts 18 are attached may affect the direction in which the electrical field extends and current flows within tested material 16 (e.g., in examples in which selected sets of material electrical contacts 18 are used as drive electrical contacts). Cracks or other defects may affect the magnitude of the voltage more significantly when the electrical field and current flow extends across a plane of the crack (e.g., normal to a surface of the crack). As such, in some examples, the likely locations of cracks or other defects and the likely orientation of cracks or other defects within tested material 16 may be predicted based on the use for tested material 16. In some of these examples, material electrical contacts 18 may then be attached to tested material 16 so that the electrical field and current flow within tested material 16 extends substantially normal to a predicted orientation of the crack or other defect.

In some examples, rather than predicting a location of the crack or other defect within tested material 16 and placing material electrical contacts 18 based on the prediction, material electrical contacts 18 may be attached to more than one surface of tested material 16. For example, if tested material 16 is in the shape of a cube, material electrical contacts 18 may be attached to three orthogonal surfaces of the cube. By attaching a respective electrical contact of material electrical contacts 18 to three orthogonal surfaces, the electrical field and current flow may be caused to extend in one of three orthogonal directions depending on the material electrical contacts 18 through which the electrical signal is applied. This may increase a likelihood that induced the electrical field and current flow will extend within tested material 16 normal to the plane of any crack in tested material 16. Other examples are possible for other shapes. In some examples, material electrical contacts 18 are distributed across a surface area of tested material 16. In other examples, material electrical contacts 18 are distributed around a perimeter of tested material 16, as shown in FIG. 1. In some examples, plurality of material electrical contacts 18 may be referred to as a set of N material electrical contacts 18.

In some examples, material electrical contacts 18 may be positioned on tested material 16 according to a selected geometric relationship, to achieve a selected relationship between voltages determined using material electrical contacts 18, or both. For example, material electrical contacts 18 may be positioned on tested material 16 so that each electrical contact of material electrical contacts 18 is substantially symmetric to another one of material electrical contacts 18 with reference to the symmetry of tested material 16. In the example of FIG. 1, first material electrical contact 18A is substantially symmetric to tenth material electrical contact 18J with reference to plane of symmetry 26, second material electrical contact 18B is substantially symmetric to ninth material electrical contact 18I with reference to plane of symmetry 26, third material electrical contact 18C is substantially symmetric to eighth material electrical contact 18H with reference to plane of symmetry 26, fourth material electrical contact 18D is substantially symmetric to ninth material electrical contact 18G with reference to plane of symmetry 26, and fifth material electrical contact 18E is substantially symmetric to sixth material electrical contact 18F with reference to plane of symmetry 26.

As another example, material electrical contacts 18 may be positioned on tested material 16 so that a respective pair of electrical contacts is substantially symmetric to another respective pair of material electrical contacts 18 with reference to the symmetry of tested material 16. In some examples, material electrical contacts 18 may be positioned on tested material 16 so that each respective pair of material electrical contacts is substantially symmetric to another respective pair of material electrical contacts 18 with reference to the symmetry of tested material 16. This may be accomplished in examples in which each material electrical contact of material electrical contacts 18 is substantially symmetric to another one of material electrical contacts 18 with reference to the symmetry of tested material 16, and a respective material electrical contact of two symmetric material electrical contacts is used in each respective pair of material electrical contacts in a symmetric pair of material electrical contacts.

Although not shown in FIG. 1, in some examples, two material electrical contacts may be positioned on the symmetry of tested material 16, e.g., on plane of symmetry 26 shown in FIG. 1.

Positioning material electrical contacts 18 to be exactly symmetrical may be difficult to achieve in practice. Hence, material electrical contacts 18 may be positioned to be substantially symmetrical. As used here, substantially symmetrical means that the material electrical contacts 18 are placed approximately symmetrical with reference to a symmetry of tested material 16, e.g., within about 0.5 mm of being symmetric, within about 0.2 mm of being symmetric or within about 0.1 mm of being symmetric.

In some examples, rather than material electrical contacts 18 being positioned based on symmetry of tested material 16, material electrical contacts 18 may be positioned to achieve a selected relationship between voltages determined using material electrical contacts 18. For example, material electrical contacts 18 may be positioned to achieve measurement of a substantially similar voltage (e.g., the same or nearly the same voltage) in the absence of a crack or other defect. In some examples, this may include positioning respective groups of material electrical contacts 18 to achieve measurement of a substantially similar voltage (e.g., the same or nearly the same voltage) in the absence of a crack or other defect. Each respective group of material electrical contacts 18 may include a pair of drive material electrical contacts and one or two measurement material electrical contacts. For example, a group of material electrical contacts 18 may include a pair of drive electrical contacts separated by one or two measurement material electrical contacts. Using material electrical contacts 18 shown in FIG. 1, an example of this configuration may include a pair of drive material electrical contacts that includes first material electrical contact 18A and fourth material electrical contact 18D, and a pair of measurement material electrical contacts that includes second material electrical contact 18B and third material electrical contact 18C. Another example of this configuration may include a pair of drive material electrical contacts that includes first material electrical contact 18A and third material electrical contact 18C, and a measurement material electrical contact that includes second material electrical contact 18B (to measure a single-ended voltage using second material electrical contact 18B and reference electrode 28).

In some examples, positioning material electrical contacts 18 so that the voltage measured using each respective group of material electrical contacts 18 is exactly the same as the voltage measured using each other respective group of material electrical contacts may be difficult to achieve in practice. Hence, material electrical contacts 18 may be positioned to be so that the voltage measured using each respective group of material electrical contacts 18 is substantially the same as the voltage measured using each other respective group of material electrical contacts 18. As used herein, substantially the same means that the material electrical contacts are placed so that the voltage measured using each respective group of material electrical contacts is within a threshold amount as the voltage measured using each other respective group of material electrical contacts in the absence of a crack or defect in tested material 16. The threshold amount may be a predetermined percentage of the measured voltage, such as, for example, 20%, 10%, 5%, or 1%.

In some examples, material electrical contacts 18 may be positioned on tested material 16 to satisfy both symmetry and substantially equal measured voltages.

System 10 includes harness 22, which includes plurality of measurement system electrical contacts 24. Harness 22 may include electrical leads electrically connecting respective ones of plurality of measurement system electrical contacts 24 to switch network 20. In some examples, harness 22 may be relatively flexible, allowing relatively free movement between respective ones of plurality of measurement system electrical contacts 24. In other examples, harness 22 may be less flexible, defining a shape and allowing relatively little movement between respective ones of plurality of measurement system electrical contacts 24.

Harness 22 may include fewer, the same number of, or more measurement system electrical contacts 24 than tested material 16 includes material electrical contacts 18. In many examples, harness 22 includes the same number of measurement system electrical contacts 24 as tested material 16 includes material electrical contacts 18.

Electrical signal source 14 may include any device configured to output an electrical signal, for example, selected ones of material electrical contacts 18 via switch network, harness 22, and measurement system electrical contacts 24. The electrical signal may include an alternating current (AC) signal or a direct current (DC) signal. In some examples, electrical signal source 14 may output a current signal; in other examples, electrical signal source 14 may output a voltage signal. In some examples, electrical signal source 14 may include a power source, such as a battery, a capacitor, a supercapacitor, a transformer electrically connected to a mains voltage, or the like. In some examples, in addition to the power source, electrical signal source 14 may include analog or digital circuitry configured to receive the electrical signal from the power source and modify the electrical signal into a format suitable for output to measurement system electrical contacts 24.

Switch network 20 includes a plurality of inputs and a plurality of outputs, with respective inputs electrically coupled to each respective output by the network of switches. For example, switch network 20 may include a pair of inputs electrically coupled to electrical signal source 14, and at least a pair of inputs electrically coupled to computing device 32. Switch network 20 may include at least as many outputs are there are measurement system electrical contacts 24 and reference electrode 28. For example, in the example shown in FIG. 1, system 10 includes ten measurement system electrical contacts 24 and one reference electrode 28, and switch network 20 thus includes at least eleven outputs. Each measurement system electrical contact of measurement system electrical contacts 24 and reference electrode 28 is electrically coupled to a respective output of switch network 20.

Control electronics 12 are configured to control operation of system 10, including electrical signal source 14 and switch network 20. Control electronics 12 may include any of a wide range of devices, including computer servers, desktop computers, notebook (i.e., laptop) computers, tablet computers, and the like. In some examples, control electronics 12 may include a processor. The processor may include one or more microprocessors, digital signal processors (DSP), application specific integrated circuits (ASIC), field programmable gate arrays (FPGA), or other digital logic circuitry. In some examples, control electronics 12 may include an analog-to-digital converter (ADC), or system 10 may include an ADC separate from control electronics 12. In examples in which the ADC is separate from control electronics 12, the ADC may be electrically coupled between a selected measurement electrical contact and control electronics 12. The ADC may measure the voltage using the selected measurement electrical contact, e.g., under control of control electronics 12.

Control electronics 12 are communicatively coupled to electrical signal source 14 and electrically coupled to switch network 20, e.g., either directly or indirectly via an external device, such as an ADC. Control electronics 12 may be configured to control electrical signal source 14 to output an electrical signal, and, in some examples, may be configured to control switch network 20 to connect a selected pair of measurement system electrical contacts 24 to electrical signal source 14 to serve as a pair of drive electrical contacts, such that the electrical signal output by electrical signal source 14 is output to the pair of drive electrical contacts.

Control electronics 12 are also configured to cause switch network 20 to connect a selected pair of measurement system electrical contacts 24 or one of measurement system electrical contacts 24 and reference electrode 28 to control electronics 12 to serve as a pair of measurement electrical contacts. In this way, control electronics 12 may determine a voltage across a pair of measurement electrical contacts in response to the electrical signal output by electrical signal source 14.

In some examples, measurement system 10 may optionally include reference electrode 28, which may not be electrically coupled to tested material 16 and may be used for single-ended voltage measurements between one electrical contact of plurality of measurement system electrical contacts 24 and reference electrode 28. Reference electrode 28 may be at a selected voltage, such a ground or an offset voltage. In some examples, control electronics 12 may use the single-ended voltages in the techniques described herein to determine whether tested material 16 includes a crack or other defect. In other examples, control electronics 12 may determine differential voltages between two electrical contacts electrically coupled to tested material 16 by comparing (e.g., subtracting) single ended voltages associated with the two electrical contacts, and control electronics 12 may use these differential voltages in the techniques described herein to determine whether material 16 includes a crack or other defect. In still other examples, control electronics 12 may determine a voltage between two of measurement system electrical contacts 24 directly, e.g., without first determining two single-ended voltages.

To measure one or more voltages to be used to determine whether tested material 16 includes a crack or other defect, control electronics 12 are configured to cause electrical signal source 14 to output an electrical signal. In some examples, as shown in FIG. 1, electrical signal source 14 is electrically connected to a set of measurement system electrical contacts 24 via switch network 20 to act as a set of drive electrical contacts, and outputs the electrical signal to the set of measurement system electrical contacts 24. As measurement system electrical contacts 24 are electrically coupled to material electrical contacts 18, the output electrical signal may pass through the set of drive electrical contacts to material electrical contacts 18, and through tested material 16.

Figure 3:
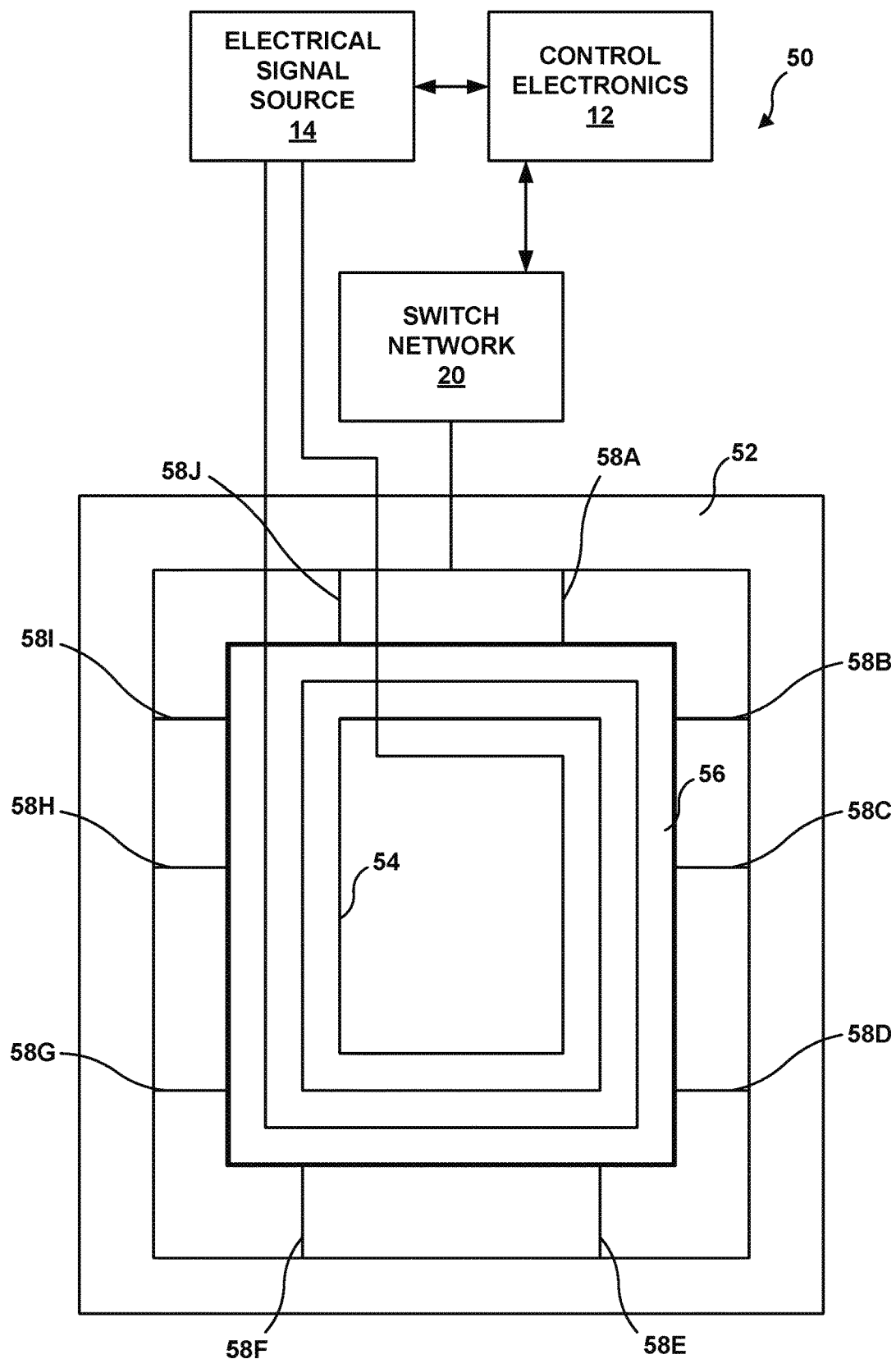
FIG. 3 is a conceptual and schematic block diagram illustrating another example measurement system for determining whether a tested material includes a crack or other defect, in which the measurement system includes at least one feature for repeatably electrically connecting the plurality of measurement system electrical contacts to selected locations of the tested material.

In other examples, as described below with reference to FIG. 3, electrical signal source 14 may be electrically connected to an inductor and may output the electrical signal to the inductor. Control electronics 12 may be configured to also cause switch network to connect control electronics 12 to two of measurement system electrical contacts 24 or one of measurement system electrical contacts 24 and reference electrode 28 as measurement electrical contacts, and may determine a measured voltage in response to the electrical signal using the measurement electrical contacts. In some examples, control electronics 12 may be configured to cause switch network to sequentially connect control electronics 12 to respective measurement electrical contacts (each including either two of measurement system electrical contacts 24 or one of measurement system electrical contacts 24 and reference electrode 28 as measurement electrical contacts), and control electronics 12 may determine a respective measured voltage in response to the electrical signal using each of the respective measurement electrical contacts.

In some examples, control electronics 12 may be configured to cause switch network to electrically connect a second set of measurement system electrical contacts 24 to electrical signal source 14 to act as a set of drive electrical contacts. Control electronics 12 may be configured to also cause switch network to connect control electronics 12 to two of measurement system electrical contacts 24 or one of measurement system electrical contacts 24 and reference electrode 28 as measurement electrical contacts, and may determine a measured voltage in response to the electrical signal applied to the second set of drive electrical contacts using the measurement electrical contacts. As measurement system electrical contacts 24 are electrically coupled to material electrical contacts 18, which are electrically coupled to tested material 16, measurement system electrical contacts 24 may be used to determine a voltage in tested material 16.

In some examples, control electronics 12 may be configured to cause switch network to sequentially connect control electronics 12 to respective measurement electrical contacts (each including either two of measurement system electrical contacts 24 or one of measurement system electrical contacts 24 and reference electrode 28 as measurement electrical contacts), and control electronics 12 may determine a respective measured voltage in response to the electrical signal using each of the respective measurement electrical contacts. Control electronics 12 may repeat this process of causing electrical signal source 14 to apply an electrical signal to a set of drive electrical contacts and determining at least one respective measured voltage for any selected number of measurement electrical contacts for each set of drive electrical contacts, and for any selected number of drive electrical contacts.

Once control electronics 12 has determined at least one measured voltage associated with a respective measurement electrical contact, control electronics may utilize the measured voltage in combination with a control voltage, another measured voltage associated with another measurement electrical contact from measurement system electrical contacts 24, or both to determine whether tested material 16 includes a crack or other defect. A control voltage may represent the voltage measured for a give combination of pair of drive electrical contacts and measurement electrical contact when tested material 16 does not include a crack or other defect. The control voltage may be based on tested material 16, a model, or an average of a plurality of materials that are similar to or substantially the same as tested material 16. For example, control electronics 12 may determine the control voltage at a time at which tested material 16 is manufactured, or a time at which an independent measurement (e.g., X-ray radiology or X-ray CT scan) may be used to verify that tested material 16 is intact, undamaged, or does not include a crack. Control electronics 12 may determine by control voltage by causing electrical signal source 14 to apply the electrical signal to a pair of drive electrical contacts from measurement system electrical contacts 24 and determining the measured voltage using a measurement electrical contact. In some examples, the control voltages may be determined using similar or substantially the same combinations of pairs of drive electrical contacts and measurement electrical contacts as are used to determine the measured voltages described above.

In other examples, the control voltage may be determined using a model of the material in an intact (undamaged) state. For example, control electronics 12 or another computing device may execute the model of tested material 16 and determine the control voltage based on the model. In some examples, the model may include a physics-based model of the electrical properties of tested material 16. In some other examples, the control voltage may be determined as an average (e.g., mean) of a plurality of similar materials (e.g., in geometry and composition) that are known to be intact (undamaged). This control voltage may be stored (e.g., in a memory device associated with control electronics 12) for later use.

Control electronics 12 may utilize the control voltage and the measured voltage to determine whether tested material 16 includes a crack or other defect. For example, control electronics 12 may determine a difference or ratio between a magnitude of the measured voltage associated with a measurement system electrical contact of measurement system electrical contacts 24 and a magnitude of the control voltage associated with the same measurement system electrical contact. Control electronics 12 then may compare this difference or ratio to a threshold voltage value or threshold ratio, and may determine that tested material 16 includes a crack or other defect in response to the difference being greater than the threshold voltage value or threshold ratio.

In some examples, rather than utilizing control voltages, control electronics 12 may utilize two or move voltages measured using tested material 16 and a predetermined relationship between the voltages to determine whether tested material 16 includes a crack or other defect. In some examples, the geometrical configuration of the set of drive electrical contacts, a first measurement electrical contact, and a second measurement electrical contact may be selected to allow meaningful comparisons between a first measured voltage determined using the first measurement electrical contact and a second measured voltage determined by the second measurement electrical contact. For example, set of drive electrical contacts may be positioned on the symmetry of tested material 16, e.g., on plane of symmetry 26. The first measurement electrical contact and second measurement electrical contact may be positioned symmetrically with reference to the symmetry of material 16, e.g., with reference to plane of symmetry 26. In such an example, the first measured voltage and the second measured voltage are expected to be substantially the same (e.g., the same or nearly the same) in the absence of a crack or other defect in tested material 16. For example, in the absence of a crack or defect in tested material 16, the first voltage and the second voltage may be within a predetermined percentage of each other, such as, for example, within about 20%, 10%, 5%, or 1% of each other. Any difference between the first and second measured voltages that is greater than a threshold difference may indicate that tested material 16 includes a crack or other defect.

As another example, a first pair of drive electrical contacts and a second pair of drive electrical contacts may be the different than each other. The first pair of drive electrical contacts and a first measurement electrical contact are a first group of electrical contacts and a second pair of drive electrical contacts and the second measurement electrical contact are a second group of electrical contacts. The first and second group of electrical contacts may be symmetric with each other relative to the symmetry of tested material 16, e.g., plane of symmetry 26. As such, in the absence of a crack or other defect in tested material 16 the first measured voltage and the second measured voltage are expected be substantially the same (e.g., the same or nearly the same). Any difference between the first and second measured voltages that is greater than a threshold difference may indicate that tested material 16 includes a crack or other defect.

As a further example, material electrical contacts 18 (if present) and measurement system electrical contacts 24 may be positioned so that, for each group that includes a pair of drive electrical contacts and a measurement electrical contact, the measured voltage in the absence of a crack or other defect is substantially the same. The respective groups of electrical contacts may or may not be symmetric to another group of electrical contacts, and tested material 16 may or may not include a symmetry. As such, regardless of the groups of electrical contacts selected as the first group of electrical contacts and the second group of electrical contacts, in the absence of a crack or other defect in material 16 the first measured voltage and the second measured voltage may be substantially the same (e.g., the same or nearly the same). Any difference between measured voltages that is greater than a threshold difference may indicate that tested material 16 includes a crack or other defect.

Because each of these techniques for determining whether tested material 16 utilizes comparisons between voltages and known positions of measurement system electrical contacts relative to tested material 16 to allow comparisons between selected measured voltages or measured voltages and selected control voltages, repeatable connection of respective ones of measurement system electrical contacts 24 to known or selected locations of tested material 16 is important. As such, measurement system 10 may include at least one at least one feature for repeatably electrically connecting the plurality of measurement system electrical contacts 24 to selected locations of tested material 16. In some examples, the at least one feature allows only certain ones of plurality of measurement system electrical contacts 24 to corresponding certain ones of plurality of material electrical contacts 18. For example, at least two of plurality of measurement system electrical contacts 24 may be keyed to corresponding ones of plurality of material electrical contacts 18. A keyed electrical contact of plurality of measurement system electrical contacts 24 may include a geometric shape, size, or both, that is different that the geometric shape, size, or both of all other electrical contacts of plurality of measurement system electrical contacts 24, so that the keyed electrical contact of plurality of measurement system electrical contacts 24 can only be connected to one complementary electrical contact of plurality of material electrical contacts 18.

In some examples, at least two of plurality of measurement system electrical contacts 24 may be keyed to corresponding ones of plurality of material electrical contacts 18. For example, the first N number of plurality of measurement system electrical contacts 24 (beginning with first measurement system electrical contact 24A or tenth measurement system electrical contact 24J) may be keyed to corresponding ones of plurality of material electrical contacts 18 so that an end of harness 22 can only be connected to material electrical contacts 18 beginning at one position and traveling in one direction. For example, having first measurement system electrical contact 24A keyed to first material electrical contact 18A and second measurement system electrical contact 24B keyed to second material electrical contact 18B may define a correct starting position and orientation (direction) for harness 22 relative to tested material 16, to enable repeatable electrical connection of the plurality of measurement system electrical contacts 24 to selected locations of tested material 16 (e.g., selected ones of material electrical contacts 18).

Figure 2:
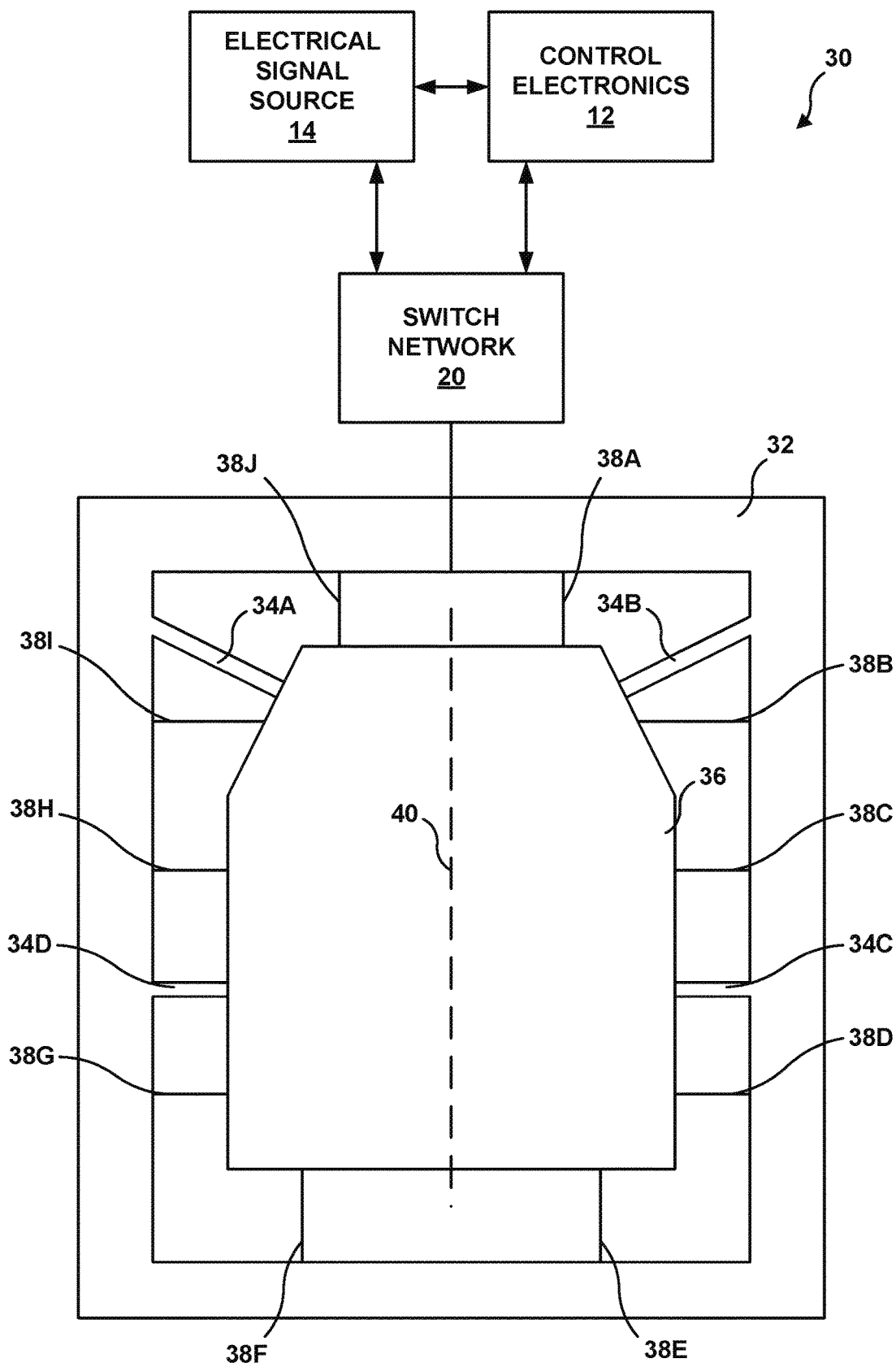
FIG. 2 is a conceptual and schematic block diagram illustrating another example measurement system for determining whether a material includes a crack or other defect, in which the measurement system includes at least one feature for repeatably electrically connecting the plurality of measurement system electrical contacts to selected locations of the tested material.

In some examples, rather than including a harness 22, a measurement system may include a fixture into or onto which a tested material is inserted. The fixture may include the at least one feature for repeatably electrically connecting the plurality of measurement system electrical contacts 24 to selected locations of tested material 16. For example, FIG. 2 is a conceptual and schematic block diagram illustrating another example measurement system 30 for determining whether a tested material 16 includes a crack or other defect. In contrast to measurement system 10, measurement system 30 includes a fixture 32 to which a plurality of measurement system electrical contacts 38 are attached. Fixture 32 also optionally includes at least one registration feature 34A-34D (collectively, "at least one registration feature 34") in or on fixture 32.

System 30 includes control electronics 12, electrical signal source 14, and switch network 20, each of which may be similar to or substantially the same as the corresponding components described above with respect to FIG. 1. FIG. 2 also illustrates a tested material 36, which may be similar to or substantially the same as tested material 16 of FIG. 1. However, unlike tested material 16, tested material 36 does not include material electrical contacts 18. In some examples in which measurement system electrical contacts 38A-38J (collectively, "measurement system electrical contacts 38") electrically couple sufficiently well to tested material 36, e.g., in examples in which tested material 36 is sufficiently electrically conductive, material electrical contacts 18 may be omitted. Material 40 also may define a symmetry, such as plane of symmetry 40.

Fixture 32 may include any physical structure that retains measurement system electrical contacts 38 in a substantially fixed relationship to each other. Fixture 32 may define an aperture or partially enclosed cavity sized and shaped to accept tested material 36. Further, fixture 32 in some examples, may include electrical conductors for electrically connecting switch network 20 to measurement system electrical contacts 38.

Fixture 32 includes at least one feature for repeatably electrically connecting the plurality of measurement system electrical contacts 38 to selected locations of tested material 36. For example, fixture 32 may include at least one registration feature 34. At least one registration feature 34 may cooperate with at least one corresponding feature on tested material 36 to orient tested material 36 in predetermined orientation relative to plurality of measurement system electrical contacts 38.

For example, as shown in FIG. 2, first registration feature 34A and second registration feature 34B may prevent tested material 36 from being fully inserted in fixture 32 in orientations other than the orientation shown in FIG. 2 (or the orientation in which tested material 40 is rotated 180 degrees about plane of symmetry 40). Registration features 34 also may align tested material 36 relative to plurality of measurement system electrical contacts 38.

In some examples, rather than including at least one registration feature 34, the at least one feature for repeatably electrically connecting the plurality of measurement system electrical contacts 38 to selected locations of tested material 36 may include the shape defined by surfaces of the plurality of measurement system electrical contacts 38. For example, as shown in FIG. 2, the shape defined by surfaces of the plurality of measurement system electrical contacts 38 is complementary to the shape of the perimeter of tested material 36 when tested material is oriented as shown in FIG. 2. In examples in which fixture 32 and the plurality of measurement system electrical contacts 38 are sufficiently rigid to substantially maintain their shape, fixture 32 and the plurality of measurement system electrical contacts 38 may be the at least one feature for repeatably electrically connecting the plurality of measurement system electrical contacts 38 to selected locations of tested material 36.

As shown in FIG. 2, in some examples, the plurality of measurement system electrical contacts 38 may be positioned or arranged according to a selected geometric relationship to tested material 36, to achieve a selected relationship between voltages measured using measurement system electrical contacts 38, or both. For example, measurement system electrical contacts 38 may be positioned on fixture 32 so that each electrical contact of measurement system electrical contacts 38 is substantially symmetric to another one of measurement system electrical contacts 38 with reference to the symmetry of tested material 36 when tested material 36 is positioned properly in or on fixture 32.

As another example, measurement system electrical contacts 38 may be positioned on fixture 32 so that a respective pair of measurement system electrical contacts 38 is substantially symmetric to another respective pair of measurement system electrical contacts 38 with reference to the symmetry of tested material 36 when tested material 36 is positioned properly in or on fixture 32. Although not shown in FIG. 2, in some examples, two measurement system electrical contacts 38 may be positioned on fixture 32 to substantially align with the symmetry of tested material 36, e.g., plane of symmetry 40, when tested material 36 is positioned properly in or on fixture 32.

Positioning measurement system electrical contacts 38 to be exactly symmetrical may be difficult to achieve in practice. Hence, measurement system electrical contacts 38 may be positioned to be substantially symmetrical. As used here, substantially symmetrical means that the measurement system electrical contacts 38 are placed approximately symmetrical with reference to a symmetry of tested material 16, e.g., within about 0.5 mm of being symmetric, within about 0.2 mm of being symmetric or within about 0.1 mm of being symmetric.

In some examples, rather than measurement system electrical contacts 38 being positioned on fixture 32 based on symmetry of tested material 36, measurement system electrical contacts 38 may be positioned on fixture 32 to achieve a selected relationship between voltages measured using measurement system electrical contacts 38. For example, measurement system electrical contacts 38 may be positioned to achieve measurement of a substantially similar voltage (e.g., the same or nearly the same voltage) in the absence of a crack or other defect. In some examples, this may include positioning respective groups of measurement system electrical contacts 38 to achieve measurement of a substantially similar voltage (e.g., the same or nearly the same voltage) in the absence of a crack or other defect. Each respective group of measurement system electrical contacts 38 may include a pair of drive electrical contacts and one or two measurement electrical contacts. For example, a group of measurement system electrical contacts 38 may include a pair of drive electrical contacts separated by one or two measurement electrical contacts.

In some examples, positioning measurement system electrical contacts 38 on fixture 32 so that the voltage measured using each respective group of measurement system electrical contacts 38 is exactly the same as the voltage measured using each other respective group of measurement system electrical contacts 38 may be difficult to achieve in practice. Hence, measurement system electrical contacts 38 may be positioned to be so that the voltage measured using each respective group of measurement system electrical contacts 38 is substantially the same as the voltage measured using each other respective group of measurement system electrical contacts 38. As used here, substantially the same means that the measurement system electrical contacts 38 are placed so that the voltage measured using each respective group of measurement system electrical contacts 38 is within a threshold amount as the voltage measured using each other respective group of measurement system electrical contacts 38 in the absence of a crack or defect in tested material 36. The threshold amount may be a predetermined percentage of the measured voltage, such as, for example, 20%, 10%, 5%, or 1%. In some examples, measurement system electrical contacts 38 may be positioned on fixture 32 to satisfy both symmetry and substantially equal measured voltages when tested material 36 is properly positioned on or in fixture 32.

In some examples, rather than utilizing drive electrical contacts to apply an electrical signal to tested material 16 or 36, as the systems 10 and 30 of FIGS. 1 and 2 do, a system may include an inductor that is used to induce electrical currents in a tested material. FIG. 3 is a conceptual and schematic block diagram illustrating another example measurement system 50 for determining whether a tested material 56 includes a crack or other defect. In contrast to measurement system 10, measurement system 50 includes a fixture 52 to which a plurality of measurement system electrical contacts 58 are attached. Fixture 52 also includes an inductor 54.

System 50 includes control electronics 12, electrical signal source 14, and switch network 20, each of which may be similar to or substantially the same as the corresponding components described above with respect to FIG. 1. FIG. 3 also illustrates a tested material 5, which may be similar to or substantially the same as tested material 16 of FIG. 1. However, unlike tested material 16, tested material 56 does not include material electrical contacts 18. In some examples in which measurement system electrical contacts 58A-58J (collectively, "measurement system electrical contacts 58") electrically couple sufficiently well to tested material 56, e.g., in examples in which tested material 56 is sufficiently electrically conductive, material electrical contacts 18 may be omitted.

Inductor 54 may include an electrical conductor arranged in any geometry suitable for an inductor. In some examples, inductor 54 may include a substantially planar coil, as shown in FIG. 3. In examples in which inductor 54 includes a coil, inductor 54 may include any number of windings. Inductor 54 may be any size, and in some examples, may be shaped and sized to that a perimeter of inductor 54 is approximately the same size and shape as a perimeter of the surface of tested material 56 near which inductor 54 will be positioned. This may allow relatively complete coverage of material 16 when testing for a crack or other defect. In other examples, inductor 54 may include another shape or size, such as a solenoid sized so that tested material 56 may be placed in the bore of the solenoid. The solenoid may have any shape, such as rectangular prism, cylindrical, elliptical cylinder, or the like.

Inductor 54 may include any suitable electrically conductive material, including, for example, copper, aluminum, silver, gold, or the like.

In some examples, the shape of fixture 52 or the surfaces defined by measurement system electrical contacts 58 may be complementary to the shape of tested material 56, fixture 52 may include one or more registration features, or the like, as described with respect to FIG. 2, to facilitate positioning of tested material 56 relative to inductor 54 and measurement system electrical contacts 58. In some examples, fixture 52 is sized and shaped so that, when tested material 56 is positioned correctly relative to fixture 52, inductor 54 is contacting or nearly contacting a surface of tested material 56. This may result in a better signal-to-noise ratio than if inductor 54 is further from tested material 56.

To determine whether tested material 56 includes a crack or other defect, control electronics 12 may be configured to cause electrical signal source 14 to apply an electrical signal to inductor 54. The electrical signal may include an AC voltage or current. Control electronics 12 also may cause electrical signal source 14 to generate the AC voltage or current with a selected amplitude, duration, frequency, phase, and other signal characteristics.

While causing electrical signal source 14 to apply the electrical signal to inductor 54, control electronics 12 may determine a measured voltage or current using at least one of measurement system electrical contacts 58. For example, control electronics 12 may cause switch network 20 to electrically couple control electronics 12 to a selected pair of measurement system electrical contacts 58 or to one of measurement system electrical contacts 58 and a reference electrode (not shown in FIG. 3). Regardless of the particular electrical contacts coupled to control electronics 12, control electronics 12 may determine a respective measured voltage or current using the selected pair of electrical contacts while electrical signal source 14 is applying the electrical signal to inductor 54.

In some examples, control electronics 12 may be configured to determine a respective measured voltage or current for a plurality of measurement electrical contacts. Once control electronics 12 has determined that there are no more additional electrical contacts from the plurality of measurement system electrical contacts 58 to be used as a measurement electrical contact, control electronics 12 may determine whether tested material 16 includes a crack or other defect based on the respective measured voltages or currents, e.g., using one of the techniques described above with respect to FIG. 1 or below with respect to FIG. 5.

Figure 4:
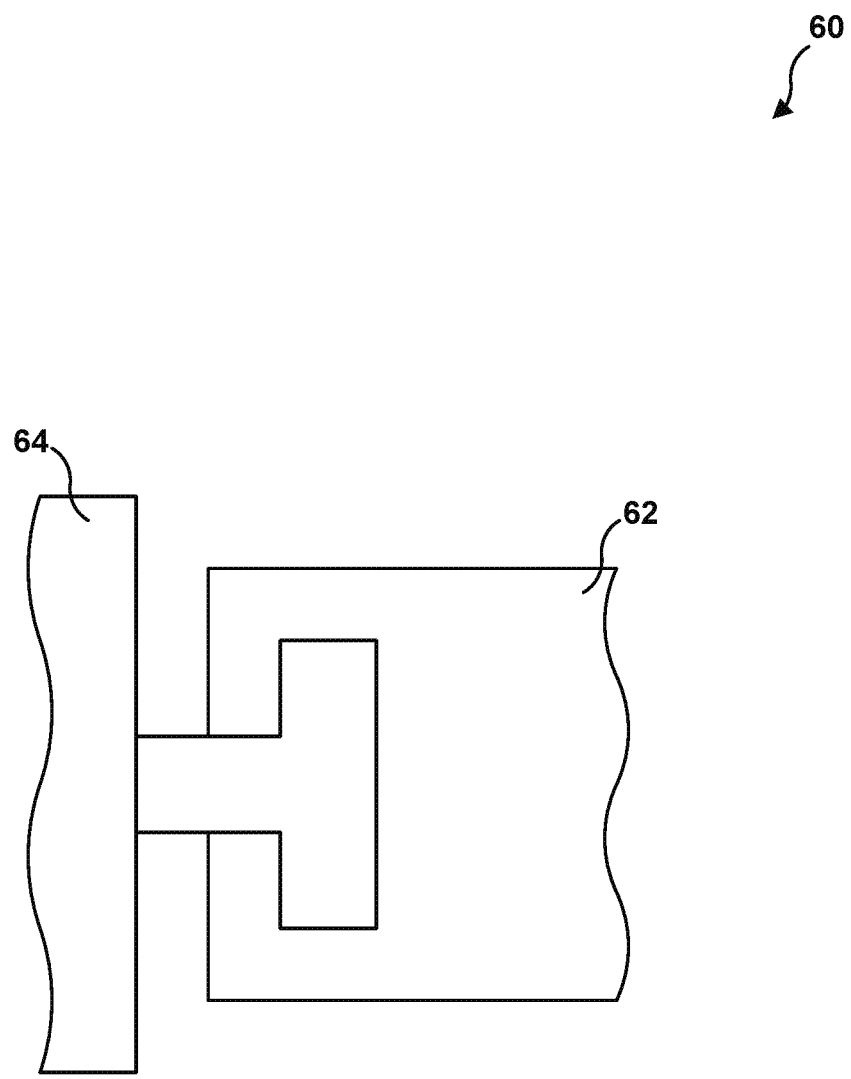
FIG. 4 is a conceptual and schematic block diagram illustrating a male electrical contact and a female electrical contact.

In some examples, the material electrical contacts 18 and the measurement system electrical contacts 24 may have complementary shapes that allow good electrical coupling, e.g., via intimate mechanical connection. For example, FIG. 4 is a conceptual and schematic block diagram illustrating a male electrical contact 64 and a female electrical contact 62. In some examples, material electrical contacts 18 may include male electrical contacts and measurement system electrical contacts 24 may include female electrical contacts. In other examples, material electrical contacts 18 may include female electrical contacts and measurement system electrical contacts 24 may include male electrical contacts. Such electrical connections 62 and 64 may facilitate electrical coupling between the measurement system and the material.

Figure 5:
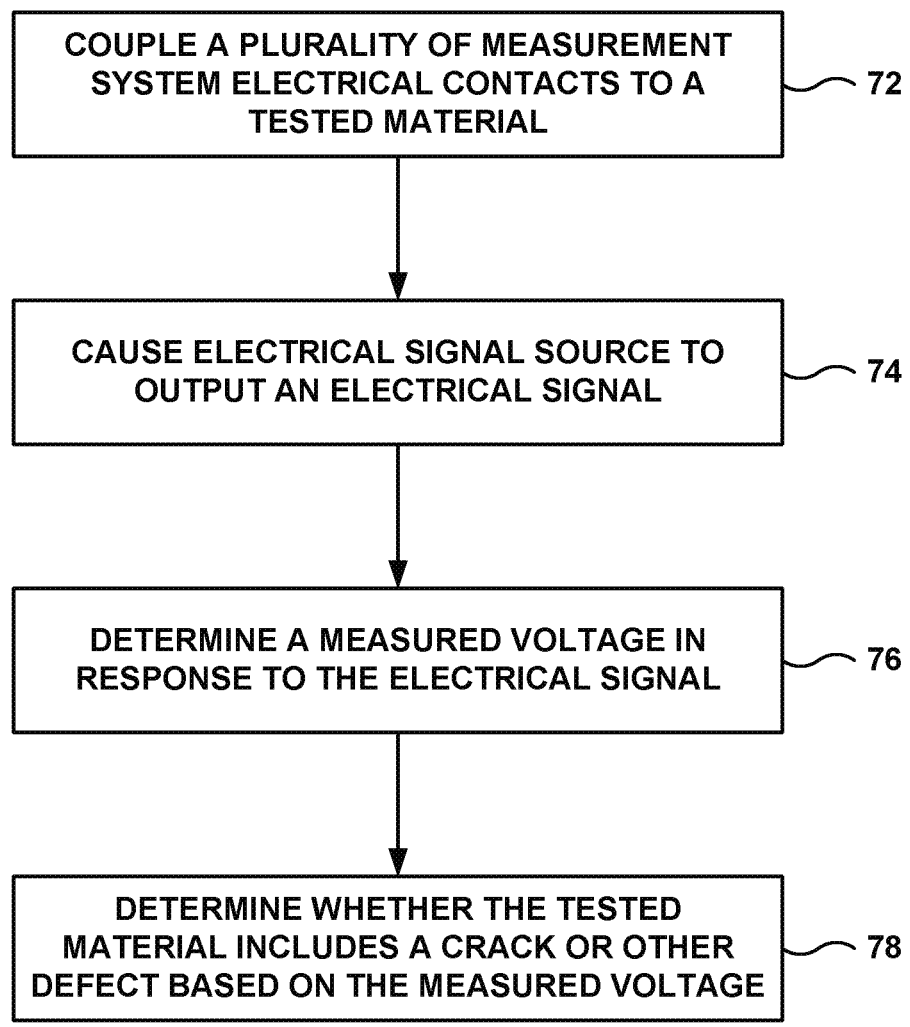
FIG. 5 is flow diagram illustrating an example technique for determining whether a tested material includes a crack or other defect, in which a measurement system includes at least one feature for repeatably electrically connecting the plurality of measurement system electrical contacts to selected locations of the tested material.

FIG. 5 is a flow diagram illustrating another example technique for determining whether a material includes a crack or other defect, in which a measurement system used to make the determination includes at least one feature for repeatably electrically connecting the plurality of measurement system electrical contacts to selected locations of a tested material. The technique of FIG. 5 will be described with concurrent reference to system 10 of FIG. 1, but it will be understood that other systems may perform the technique of FIG. 5 (e.g., systems 30 and 50 of FIGS. 2 and 3), and that system 10 may be used to perform other techniques.

The technique of FIG. 5 includes coupling a plurality of measurement system electrical contacts 24 of a measurement system 10 to a tested material 16 (72). Measurement system 10 includes at least one feature for repeatably electrically connecting the plurality of measurement system electrical contacts 24 to selected locations of tested material 16. For example, as described with reference to FIG. 1, at least two of measurement system electrical contacts 24 may be keyed to a respective corresponding material electrical contact. A keyed electrical contact of plurality of measurement system electrical contacts 24 may include a geometric shape, size, or both, that is different that the geometric shape, size, or both of all other electrical contacts of plurality of measurement system electrical contacts 24, so that the keyed electrical contact of plurality of measurement system electrical contacts 24 can only be connected to one complementary electrical contact of plurality of material electrical contacts 18. For example, having first measurement system electrical contact 24A keyed to first material electrical contact 18A and second measurement system electrical contact 24B keyed to second material electrical contact 18B may define a correct starting position and orientation (direction) for harness 22 relative to tested material 16, to enable repeatable electrical connection of the plurality of measurement system electrical contacts 24 to selected locations of tested material 16 (e.g., selected ones of material electrical contacts 18).

As another example, as described with reference to FIG. 2, the at least one feature for repeatably electrically connecting the plurality of measurement system electrical contacts 24 to selected locations of tested material 16 may include a shape and size of fixture 32, may include at least one registration feature 34 on or in fixture 32 that cooperates with at least one corresponding feature on tested material 36 to orient tested material 36 in predetermined orientation relative to plurality of measurement system electrical contacts 38, or may include a shape defined by surfaces of the plurality of measurement system electrical contacts 38. For example, as shown in FIG. 2, the shape defined by surfaces of the plurality of measurement system electrical contacts 38 is complementary to the shape of the perimeter of tested material 36 when tested material is oriented as shown in FIG. 2. In examples in which fixture 32 and the plurality of measurement system electrical contacts 38 are sufficiently rigid to substantially maintain their shape, fixture 32 and the plurality of measurement system electrical contacts 38 may be the at least one feature for repeatably electrically connecting the plurality of measurement system electrical contacts 38 to selected locations of tested material 36.

Once the plurality of measurement system electrical contacts 24 are electrically coupled to tested material 16 (72), the technique of FIG. 5 may include causing, by control electronics 12, electrical signal source 14 to output an electrical signal (74). In some examples, causing electrical signal source 14 to output the electrical signal (74) may include causing electrical signal source 14 to apply the electrical signal to a first set of drive electrical contacts electrically coupled to tested material 16. For example, control electronics 12 may cause switch network 20 to electrically couple electrical signal source 14 to a selected set of measurement system electrical contacts 24, which serves as a set of drive electrical contacts. The set of drive electrical contacts may be electrically coupled to tested material directly (e.g., as shown in FIG. 2) or indirectly (e.g., via corresponding material electrical contacts 18 as shown in FIG. 1). The selected pair of measurement system electrical contacts 24 may include any two electrical contacts of measurement system electrical contacts 24. In some examples, the selected set of measurement system electrical contacts 24 may be adjacent to each other; in other examples, the selected set of measurement system electrical contacts 24 may be spaced apart. For example, in some instances, the selected set of measurement system electrical contacts 24 may be substantially opposite each other in the array of measurement system electrical contacts 24, or may be separated by a predetermined number of measurement system electrical contacts 24, e.g., separated by two electrical contacts of measurement system electrical contacts 24. In some examples, the set of measurement system electrical contacts 24 may include two electrical contacts that contact a symmetry of tested material 16.

Control electronics 12 then may cause electrical signal source 14 to apply the electrical signal to the first set of drive electrical contacts, e.g., via switch network 20. The electrical signal may include an AC signal or a DC signal, and may include a current signal or a voltage signal. In some examples, the type of electrical signal may depend on the composition of tested material 16. For example, a DC signal may be used to measure a voltage of an electrically conductive or electrically semiconductive material, while an AC signal may be used to measure a voltage of an electrically conductive material, an electrically semiconductive material, or a dielectric material. Control electronics 12 also may control electrical signal source 14 to generate the predetermined electrical signal with a selected amplitude, duration, frequency, and other signal characteristics.

In other examples, rather than causing electrical signal source 14 to apply the electrical signal to the first set of drive electrical contacts, a measurement 50 may include an inductor 54, and electrical signal source 14 may apply or output the electrical signal to inductor 54. The electrical signal may include an AC signal, and may include a current signal or a voltage signal.

Regardless of whether electrical signal source 14 outputs the electrical signal to inductor 54 or a pair of drive electrical contacts, the technique of FIG. 5 also includes, while electrical signal source 14 is outputting the electrical signal, determining a measured voltage using a measurement electrical contact electrically coupled to tested material 16 (76). For example, control electronics 12 may cause switch network 20 to electrically couple control electronics 12 to a selected pair of measurement electrical contacts. The selected pair of measurement electrical contacts may be any two electrical contacts from measurement system electrical contacts 24, neither of which is being used as one of the electrical contacts in the set of drive electrical contacts, or may be reference electrode 28 and any one of measurement system electrical contacts 24 that is not being used as one of the electrical contacts in the set of drive electrical contacts. In some examples, the two electrical contacts in the pair of measurement electrical contacts may be adjacent to each other. In other examples, the two electrical contacts in the pair of measurement electrical contacts may be spaced each other with one or more electrical contacts between. Using adjacent electrical contacts as the pair of measurement electrodes may result in a higher signal-noise-ratio in the voltage measurement, but may reduce an area of tested material 16 for which the voltage is measured. Regardless of the particular electrical contacts coupled to control electronics 12, control electronics 12 may determine a voltage using the measurement electrical contacts (76) while electrical signal source 14 is outputting the electrical signal (74).

In some examples, control electronics 12 may be configured to determine a respective measured voltage for a plurality of measurement electrical contacts for each pair of drive electrical contacts or for inductor 54. Hence, in some examples, the technique of FIG. 5 further includes determining whether there is an additional measurement electrical contact for which to determine a measured voltage (76) for the selected pair of drive electrodes. In response to determining that there is an additional electrical contact to be used as a measurement electrical contact, control electronics 12 may cause switch network 20 to couple the selected electrical contact to control electronics 12. Control electronics 12 then may determine a measured voltage using the selected measurement electrical contact (76).

Control electronics 12 may repeat this determination, coupling of a selected measurement electrical contact to computing device 12 using switch network 20, and determination of a respective measured voltage (74) until control electronics 12 determines there are no additional measurement system electrical contacts 24 to be used as a measurement electrical contact for the selected pair of drive electrical contacts or the inductor 54.

In some examples, the technique of FIG. 5 optionally includes determining, by control electronics 12, whether there is an additional pair of drive electrical contacts or an additional inductor 54 to which to output the electrical signal. For example, control electronics 12 may be configured to utilize each unique pair of electrical contacts from measurement system electrical contacts 24 or each unique pair of electrical contacts separated by a predetermined number of electrical contacts (e.g., two electrical contacts) as a pair of drive electrical contacts. In other examples, only a single pair of electrical contacts 18 may be utilized as a pair of drive electrical contacts, and the technique of FIG. 5 may not include determining whether there is an additional pair of drive electrical contacts to which to apply the electrical signal.

Once control electronics 12 has determined that there are no additional pairs of measurement system electrical contacts 24 to be used as a pair of drive electrical contacts, control electronics 12 may determine whether tested material 16 includes a crack or other defect based on the measured voltage or measured voltages (78). For example, control electronics 12 may determine whether tested material 16 includes a crack or other defect based on a comparison between voltages. For example, control electronics 12 or another computing device may perform steps (72)-(76) of the technique of FIG. 5 on tested material 16 at a first time at which it is known that tested material 16 is intact, i.e., does not include a crack or other defect. For example, the first time may be a time at which tested material 16 is manufactured, or a time at which an independent measurement (e.g., X-ray radiology or X-ray CT scan) may be used to verify that tested material 16 is intact, undamaged, or does not include a crack. These respective control voltages may be stored (e.g., in a memory device associated with control electronics 12) for later use. For example, the respective control voltages may be stored in a data structure in which each respective control voltage is associated with a pair of drive electrical contacts to which the electrical signal was applied during the voltage measurement and a pair of measurement electrical contacts with which the respective control voltage was measured. In other examples, the control voltage may be determined using a model of the material in an intact (undamaged) state, or the control voltage may be determined as an average (e.g., mean) of a plurality of similar materials (e.g., in geometry and composition) that are known to be intact (undamaged).

Control electronics 12 then may compare the respective measurement voltages to respective control voltages and determine whether tested material 16 includes a crack or other defect based on the comparison. For example, control electronics 12 may compare each respective measured voltage with a corresponding (i.e., associated with the same pair of drive electrical contacts and the same pair of measurement electrical contacts) control voltage. As an example, control electronics 12 subtract the corresponding control voltage from the respective measured voltage. In some examples, control electronics may compare the respective voltage difference (between the respective measurement voltage and the respective control voltage) to a threshold voltage value.

The threshold voltage value may be selected so that a voltage difference above the threshold voltage value is meaningful (e.g., indicative of a crack or other defect) and a voltage difference below the threshold voltage value is not meaningful (e.g., is not indicative of a crack or other defect). In some examples, the threshold value may be selected to be a voltage value that is slightly greater than a noise floor of the measurement, such that any voltage difference that exceeds the noise floor is determined by control electronics 12 to be indicative of a crack or other defect.

In some examples, after comparing each respective measurement voltage against a corresponding control voltage and comparing the difference to the threshold voltage value to determine if the respective measurement voltage is indicative of a crack or other defect, control electronics 12 may determine whether a crack or other defect is present in tested material 16 based on the plurality of indications. For example, control electronics 12 may determine a number of differences that are indicative of a crack and compare this number of differences to a threshold number of differences to determine if tested material 16 includes a crack or other defect.

As another example, control electronics 12 may determine whether tested material 16 includes a crack or other defect based on the respective measured voltages (78) by comparing each respective measured voltage to a threshold voltage value. For example, control electronics 12 may compare the respective measured voltage to the threshold voltage value, and may determine that the respective measured voltage indicates that tested material 16 includes a crack or other defect in response to the respective measured voltage being less than the threshold voltage value. In some examples, the threshold voltage may be selected so that a measured voltage below the threshold voltage value is indicative of a crack or other defect and a measured voltage above the threshold voltage value is not indicative of a crack or other defect. In some examples, after comparing each respective measured voltage to the threshold voltage value to determine if the respective measured voltage is indicative of a crack or other defect, control electronics 12 may determine whether tested material 16 includes a crack or other defect based on the plurality of indications. For example, control electronics 12 may determine a number of measured voltages that are indicative of a crack and compare this number of measurement voltages to a threshold number of measured voltages to determine if tested material 16 includes a crack or other defect.

In some examples, rather than utilizing differences between a measured voltage and a corresponding control voltage, control electronics 12 may determine a ratio between each respective measured voltage and a corresponding respective control voltage. In some examples, multiple electrode pair voltages may be associated with the same pair of measurement electrical contacts from measurement system electrical contacts 24, e.g., due to multiple measurements with different pairs of drive electrical contacts or inductors. In such examples, control electronics 12 may determine a ratio between each respective measured voltage and the respective control voltage associated with the same pair of measurement system electrical contacts 24. By determining a ratio between the measured voltage and the control voltage, effects of temperature differences in the material between the time at which the control voltage was determined and the measured voltage was determined may be reduced.

Control electronics 12 may utilize the ratio(s) in one of a variety of techniques to determine whether tested material 16 includes a crack or other defect. For example, control electronics 12 may utilize pattern recognition. In some examples, for each measurement electrical contact from measurement system electrical contacts 24, control electronics 12 may sum all ratios associated with the respective measurement electrical contact. Control electronics 12 may then determine whether any adjacent sets of measurement electrical contacts are associated with sums that follow a predetermined pattern, such as a low-high-low pattern, a low-high-high-high-low pattern, or the like. The particular pattern that indicates that tested material 16 includes a crack or other defect may depend on positioning of measurement system electrical contacts 24, including spacing between adjacent measurement system electrical contacts of measurement system electrical contacts 24; crack location and orientation within tested material 16; and the like. In other examples, control electronics 12 may use pattern recognition on each set of ratios associated a respective measurement electrical contact, and may compare the results of the various pattern recognitions to arrive at a final determination of whether tested material 16 includes a crack or other defect.

As another example, control electronics 12 may determine whether tested material 16 includes a crack or other defect by determining whether any of the measured voltages, ratios, or the sum of measured voltages or ratios, associated with a single pair of measurement electrical contacts, is an outlier compared to measured voltages, ratios, or sums of measured voltages or ratios, associated with other measurement electrical contacts. Cracks or other defects are expected to create regions of higher electrical resistance in tested material 16, which is expected to result in higher voltages being measured for measurement electrical contacts in which current will flow across or through regions of higher electrical resistance. Hence, an outlier of higher temperature-corrected electrode pair values indicates that tested material 16 includes a crack or other defect.

As a further example, control electronics 12 may determine whether tested material 16 includes a crack or other defect by determining an overall score for tested material 16. For example, control electronics 12 may sum all ratios associated with a respective measurement electrical contact to generate a single value associated with each respective measurement electrical contact. Control electronics 12 then may mathematically manipulate these values to arrive at a single score for tested material 16. For example, control electronics 12 may sum the ratios, take each ratio to a predetermined power and sum the products, average the ratios, determine a weighted average of the ratios, or the like to determine a single score for testing material 16. Control electronics 12 then may compare the single score to a threshold score value and determine that tested material 16 includes a crack or other defect if the single score is greater than the threshold score value.

As another example, in implementations in which measurement system electrical contacts 24 are positioned symmetrically about tested material 16 with reference to a symmetry of tested material 16, a set of drive electrical contacts may be positioned on the symmetry of tested material 16, e.g., on plane of symmetry 26. The first measurement electrical contact and second measurement electrical contact may be positioned symmetrically with reference to the symmetry of tested material 16, e.g., with reference to plane of symmetry 26. In such an example, a first measured voltage determined using the first measurement electrical contact and a second measured voltage determined using the second measurement electrical contact are expected to be substantially the same (e.g., the same or nearly the same) in the absence of a crack or other defect in tested material 16. For example, in the absence of a crack or defect in tested material 16, the first voltage and the second voltage may be within a predetermined percentage of each other, such as, for example, within about 20%, 10%, 5%, or 1% of each other. Any difference between the first and second measured voltages that is greater than a threshold difference may indicate that tested material 16 includes a crack or other defect.

As another example, in implementations in which measurement system electrical contacts 24 are positioned symmetrically about tested material 16 with reference to a symmetry of tested material 16, a first pair of drive electrical contacts and a second pair of drive electrical contacts may be the different than each other. The first pair of drive electrical contacts and a first measurement electrical contact are a first group of electrical contacts and a second pair of drive electrical contacts and the second measurement electrical contact are a second group of electrical contacts. The first and second group of electrical contacts may be symmetric with each other relative to the symmetry of tested material 16, e.g., plane of symmetry 26. As such, in the absence of a crack or other defect in tested material 16 the first measured voltage and the second measured voltage are expected be substantially the same (e.g., the same or nearly the same). Any difference between the first and second measured voltages that is greater than a threshold difference may indicate that tested material 16 includes a crack or other defect.

As a further example, in implementations in which measurement system electrical contacts 24 are positioned symmetrically about tested material 16 with reference to a symmetry of tested material 16, material electrical contacts 18 (if present) and measurement system electrical contacts 24 may be positioned so that, for each group that includes a pair of drive electrical contacts and a measurement electrical contact, the measured voltage in the absence of a crack or other defect is substantially the same. The respective groups of electrical contacts may or may not be symmetric to another group of electrical contacts, and tested material 16 may or may not include a symmetry. As such, regardless of the groups of electrical contacts selected as the first group of electrical contacts and the second group of electrical contacts, in the absence of a crack or other defect in material 16 the first measured voltage and the second measured voltage may be substantially the same (e.g., the same or nearly the same). Any difference between measured voltages that is greater than a threshold difference may indicate that tested material 16 includes a crack or other defect.

In any of the techniques described herein, control electronics 12 may output a representation of the determination of whether tested material 16 includes a crack or other defect. In some examples, the representation may include a simplified output, such as an indication of "Yes" or "No," "Crack" or "No Crack," "Damaged" or "Intact," or the like. The representation may be textual, icon-based, color-based, or the like. For example, the representation may include a green light to represent that tested material 16 is still intact or a red light to represent that tested material 16 is damages or includes a crack or other defect.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Clause 1: A measurement system for detecting a crack or other defect in a material, the system comprising: control electronics; an electrical signal source; a plurality of measurement system electrical contacts; at least one feature for repeatably electrically connecting the plurality of measurement system electrical contacts to selected locations of a tested material, wherein the control electronics are configured to: cause the electrical signal source to output an electrical signal; determine a measured voltage in response to the electrical signal using a measurement electrical contact from the plurality of measurement system electrical contacts, wherein the measurement electrical contact is electrically coupled to the tested material; and determine whether the tested material includes a crack or other defect based on the measured voltage.

Clause 2: The measurement system of clause 1, wherein the electrical signal source is configured to apply the electrical signal to a pair of drive electrical contacts from the plurality of measurement system electrical contacts.

Clause 3: The measurement system of clause 1, further comprising an inductor, wherein the electrical signal source is configured to apply the electrical signal to the inductor, and wherein the electrical signal conducting through the inductor induces eddy currents in the tested material.

Clause 4: The measurement system of any one of clauses 1 to 3, wherein the material includes a plurality of material electrical contacts, and wherein the at least one feature for repeatable electrically connecting the plurality of measurement system electrical contacts to selected locations of the tested material comprises at least two of the measurement system electrical contacts that are keyed to corresponding material electrical contacts.

Clause 5: The measurement system of clause 4, wherein a first material electrical contact and a second material electrical contact each defines a unique geometry or size relative to the other material electrical contacts of the plurality of material electrical contacts, wherein a first measurement system electrical contact that defines a unique geometry or size relative to the other measurement system electrical contacts and a second measurement system electrical contact that that defines a unique geometry or size relative to the other measurement system electrical contacts, wherein the unique geometry or size of the first measurement system electrical contact is complementary to the unique geometry or size of the first material electrical contact, and wherein the unique geometry or size of the second measurement system electrical contact is complementary to the unique geometry or size of the second material electrical contact.

Clause 6: The measurement system of clause 1 to 3, further comprising a fixture, wherein the plurality of measurement system electrical contacts are attached to the fixture, and wherein the at least one feature for repeatable electrically connecting the plurality of measurement system electrical contacts to selected locations of the tested material comprises the shape defined by surfaces of the plurality of measurement system electrical contacts.

Clause 7: The measurement system of clause 6, wherein the shape defined by surfaces of the plurality of measurement system electrical contacts is configured to allow insertion of the tested material into the fixture in only one orientation.

Clause 8: The measurement system of clause 1 to 3, further comprising a fixture, wherein the plurality of measurement system electrical contacts are attached to the fixture, and wherein the at least one feature for repeatable electrically connecting the plurality of measurement system electrical contacts to selected locations of the tested material comprises at least one registration feature in or on the fixture.

Clause 9: The measurement system of any one of clauses 1 to 8, wherein the plurality of measurement system electrical contacts comprise female electrical contacts configured to accept corresponding male material electrical contacts electrically coupled to the tested material.

Clause 10: The measurement system of any one of clauses 1 to 9, wherein the plurality of measurement system electrical contacts comprise male electrical contacts configured to contact the tested material.

Clause 11: The measurement system of any one of clauses 1 to 9, wherein the plurality of measurement system electrical contacts comprise male electrical contacts configured to contact respective material electrical contacts on the tested material.

Clause 12: The measurement system of any one of clauses 6 to 11, wherein the plurality of measurement system electrical contacts are arranged symmetrically on the fixture with reference to a symmetry of the tested material inserted in the fixture.

Clause 13: The measurement system of clause 12, wherein the symmetry is a point, a line, a plane, a curve, or a manifold, and wherein a single mathematical operation made with reference to the symmetry maps each measurement electrical contact of the plurality of measurement system electrical contacts to another measurement system electrical contact of the plurality of measurement system electrical contacts.

Clause 14: The measurement system of any one of clauses 1 to 13, further comprising a switch network, wherein the control electronics are further configured to control the switch network to selectively connect a first measurement system electrical contact and a second measurement system electrical contact to the electrical signal source as the pair of drive electrical contacts and selectively connect a third measurement system electrical contact to the control electronics as the measurement electrical contact.

Clause 15: The measurement system of any one of clauses 1 to 14, wherein the control electronics are configured to: for each respective pair of drive electrical contacts of at least one pair of drive electrical contacts from the plurality of measurement system electrical contacts, cause the electrical signal source to apply a respective electrical signal to the respective pair of drive electrical contacts; for each respective pair of drive electrical contacts, determine a respective measured voltage using a respective measurement electrical contact of a plurality of measurement electrical contacts from the plurality of measurement system electrical contacts while applying the electrical signal to the respective pair of drive electrical contacts; and determine whether the tested material includes a crack or other defect based on the respective measured voltages.

Clause 16: The measurement system of any one of clauses 1 to 15, wherein the control electronics are configured to determine the measured voltage using two measurement electrical contacts from the plurality of measurement system electrical contacts.

Clause 17: The measurement system of any one of clauses 1 to 16, further comprising a memory device, wherein the control electronics are configured to retrieve a control voltage from the memory device, wherein the control voltage is a voltage measured for the tested material when the tested material is known to not include a crack or other defect, and wherein the control electronics are configured to determine whether the tested material includes a crack or other defect based on the measured voltage and the control voltage.

Clause 18: The measurement system of clause 17, wherein the control electronics are configured to determine whether the tested material includes a crack or other defect based on a ratio between the measured voltage and the control voltage or a difference between the measured voltage and the control voltage.

Clause 19: A method for detecting a crack or defect in a material, the method comprising:
coupling a plurality of measurement system electrical contacts of a measurement system to a tested material, wherein the measurement system comprises at least one feature for repeatably electrically connecting the plurality of measurement system electrical contacts to selected locations of a tested material; causing, by control electronics, an electrical signal source to output an electrical signal; determining, by the control electronics, a measured voltage in response to the electrical signal using a measurement electrical contact from the plurality of measurement system electrical contacts; and determining, by the control electronics, whether the tested material includes a crack or other defect based on the measured voltage.

Clause 20: The method of clause 19, wherein causing the electrical signal source to output the electrical signal comprises causing the electrical signal source to apply the electrical signal to a pair of drive electrical contacts from the plurality of measurement system electrical contacts.

Clause 21: The method of clause 19, wherein causing the electrical signal source to output the electrical signal comprises causing the electrical signal source to apply the electrical signal to an inductor, and wherein the electrical signal conducting through the inductor induces eddy currents in the tested material.

Clause 22: The method of any one of clauses 19 to 21, wherein coupling the plurality of measurement system electrical contacts of the measurement system to the tested material comprises: coupling a first keyed measurement system electrical contact to a corresponding keyed material electrical contact; and coupling a second keyed measurement system electrical contact to a corresponding keyed material electrical contact.

Clause 23: The method of clause 22, wherein a first material electrical contact and a second material electrical contact each defines a unique geometry relative to the other material electrical contacts of the plurality of material electrical contacts, wherein a first measurement system electrical contact that defines a unique geometry relative to the other measurement system electrical contacts and a second measurement system electrical contact that that defines a unique geometry relative to the other measurement system electrical contacts, wherein the unique geometry of the first measurement system electrical contact is complementary to the unique geometry of the first material electrical contact, and wherein the unique geometry of the second measurement system electrical contact is complementary to the unique geometry of the second material electrical contact.

Clause 24: The method of any one of clauses claims 19 to 21, further comprising a fixture, wherein the plurality of measurement system electrical contacts are mechanically attached to the fixture, and wherein the at least one feature for repeatable electrically connecting the plurality of measurement system electrical contacts to selected locations of the tested material comprises the shape defined by surfaces of the plurality of measurement system electrical contacts.

Clause 25: The method of clause 24, wherein the shape defined by surfaces of the plurality of measurement system electrical contacts is configured to allow insertion of the tested material into the fixture in only one orientation.

Clause 26: The method of any one of clauses 19 to 21, further comprising a fixture, wherein the plurality of measurement system electrical contacts are mechanically attached to the fixture, wherein the at least one feature for repeatable electrically connecting the plurality of measurement system electrical contacts to selected locations of the tested material comprises at least one registration feature in or on the fixture, and wherein coupling the plurality of measurement system electrical contacts of the measurement system to the tested material comprises aligning the at least one registration feature in or on the fixture to a complementary registration feature in or on the tested material.

Clause 27: The method of any one of clauses 19 to 26, wherein the plurality of measurement system electrical contacts comprise female electrical contacts configured to accept corresponding male material electrical contacts electrically coupled to the tested material.

Clause 28: The method of any one of clauses 19 to 26, wherein the plurality of measurement system electrical contacts comprise male electrical contacts configured to contact the tested material.

Clause 29: The method of any one of clauses 19 to 26, wherein the plurality of measurement system electrical contacts comprise male electrical contacts configured to contact respective material electrical contacts on the tested material.

Clause 30: The method of any one of clauses 24 to 29, wherein the plurality of measurement system electrical contacts are arranged symmetrically on the fixture with reference to a symmetry of the tested material inserted in the fixture.

Clause 31: The method of clause 30, wherein the symmetry is a point, a line, a plane, a curve, or a manifold, and wherein a single mathematical operation made with reference to the symmetry maps each measurement selectrical contact of the plurality of measurement system electrical contacts to another measurement system electrical contact of the plurality of measurement system electrical contacts.

Clause 32: The method of any one of clauses 19 to 31, further comprising a switch network, the method further comprising: causing, by the control electronics, the switch network to selectively connect a first measurement system electrical contact and a second measurement system electrical contact to the electrical signal source as the pair of drive electrical contacts and selectively connect a third measurement system electrical contact to the control electronics as the measurement electrical contact.

Clause 33: The method of any one of clauses 19 to 32, wherein: causing the electrical signal source to output the electrical signal comprises, for each respective pair of drive electrical contacts of at least one pair of drive electrical contacts from the plurality of measurement system electrical contacts, causing the electrical signal source to apply a respective electrical signal to the respective pair of drive electrical contacts; determining the measured voltage in response to the electrical signal comprises, for each respective pair of drive electrical contacts, determining a respective measured voltage using a respective measurement electrical contact of a plurality of measurement electrical contacts from the plurality of measurement system electrical contacts while applying the electrical signal to the respective pair of drive electrical contacts; and determining whether the tested material includes the crack or other defect based on the measured voltage comprises determining whether the tested material includes a crack or other defect based on the respective measured voltages.

Clause 34: The method of any one of clauses 19 to 33, wherein determining the measured voltage comprises determining the measured voltage using two measurement electrical contacts from the plurality of measurement system electrical contacts.

Clauses 35: The method of any one of clauses 19 to 34, further comprising: retrieving a control voltage from a memory device, wherein the control voltage is a voltage measured for the tested material when the tested material is known to not include a crack or other defect, and wherein determining whether the tested material includes the crack or other defect comprises determining whether the tested material includes a crack or other defect based on the measured voltage and the control voltage.

Clause 36: The method of clause 35, wherein determining whether the tested material includes the crack or other defect comprises determining whether the tested material includes the crack or other defect based on a ratio between the measured voltage and the control voltage or a difference between the measured voltage and the control voltage.

Various examples have been described. These and other examples are within the scope of the following claims.

What is claimed is:

1. A measurement system for detecting a defect in a tested material, the system comprising:
control electronics;
an electrical signal source communicatively coupled to the control electronics;
a plurality of measurement system electrical contacts; and
at least one feature for repeatably electrically connecting the plurality of measurement system electrical contacts, at a given time, to one of (i) selected locations of a control material, or (ii) selected locations of the tested material, wherein the control electronics are configured to:
cause the electrical signal source to output a control electrical signal to be passed through the control material;
determine a control voltage in response to the control electrical signal passed through the control material using a selected pair of measurement electrical contacts of the plurality of measurement system electrical contacts at a time when the selected pair of measurement electrical contacts is electrically connected to the control material;
sequentially connect the control electronics to respective pairs of measurement electrical contacts of the plurality of measurement system electrical contacts during a time when the plurality of measurement system electrical contacts are connected to the tested material;
cause the electrical signal source to output a respective test electrical signal to be passed through the tested material in response to each of the respective pairs of measurement electrical contacts being sequentially connected to the tested material;
determine a measured voltage in response to the respective test electrical signals being passed through the tested material using one or more of the respective pairs of measurement electrical contacts of the plurality of measurement system electrical contacts during the time when the first measurement electrical contact is electrically coupled to the tested material;
compare the measured voltage to the control voltage; and
determine whether the tested material includes the defect based on whether the comparison indicates that the measured voltage is within a predetermined percentage of the control voltage.

2. The measurement system of claim 1, wherein the control electronics are configured to cause the electrical signal source to apply the control electrical signal and each respective test electrical signal via a pair of drive electrical contacts of the plurality of measurement system electrical contacts.

3. The measurement system of claim 1, further comprising an inductor, wherein the electrical signal source is configured to apply the control electrical signal to the inductor at a time when the inductor is electrically coupled to the control material, wherein the electrical signal source is configured to apply each respective test electrical signal to the inductor during a time when the inductor is electrically coupled to the tested material, and wherein each of the control electrical signal and each respective test electrical signal, when conducting through the inductor, induces eddy currents in the control material and the tested material, respectively.

4. The measurement system of claim 1, wherein the tested material includes a plurality of material electrical contacts, and wherein the at least one feature comprises at least two of the measurement system electrical contacts keyed to corresponding material electrical contacts of the plurality of material electrical contacts.

5. The measurement system of claim 4, wherein a first material electrical contact of the plurality of material electrical contacts defines a first unique geometry or size relative to first remaining material electrical contacts of the plurality of material electrical contacts other than the first material electrical contact, wherein a second material electrical contact of the plurality of material electrical contacts defines a second unique geometry or size relative to second remaining material electrical contacts o other than the second material electrical contact, wherein a first measurement system electrical contact defines a first unique geometry or size relative to first remaining measurement system electrical contacts other than the first measurement system electrical contact, wherein a second measurement system electrical contact defines a second unique geometry or size relative to second remaining measurement system electrical contacts other than the second measurement system electrical contact, wherein the first unique geometry or size of the first measurement system electrical contact is complementary to the first unique geometry or size of the first material electrical contact to enable electrical coupling between the first measurement system electrical contact and the first material electrical contact, and wherein the second unique geometry or size of the second measurement system electrical contact is complementary to the second unique geometry or size of the second material electrical contact to enable electrical coupling between the second measurement system electrical contact and the second material electrical contact.

6. The measurement system of claim 1, further comprising a fixture, wherein the plurality of measurement system electrical contacts are attached to the fixture, and wherein the at least one feature for repeatably electrically connecting the plurality of measurement system electrical contacts conforms to a shape defined by respective surfaces of the plurality of measurement system electrical contacts.

7. The measurement system of claim 6, wherein the shape defined by the respective surfaces of the plurality of measurement system electrical contacts allows insertion of the control material or the tested material into the fixture in only one orientation.

8. The measurement system of claim 6, wherein the plurality of measurement system electrical contacts comprise one or more of:
  (i) female electrical contacts configured to accept corresponding male material electrical contacts electrically coupled to one of the control material or the tested material;
  (ii) male electrical contacts configured to contact one of the control material or the tested material; or
  (iii) male electrical contacts configured to contact respective material electrical contacts on one of the control material or the tested material.

9. The measurement system of claim 6, wherein the plurality of measurement system electrical contacts are arranged symmetrically on the fixture with reference to a symmetry of the control material or the tested material as inserted into the fixture.

10. The measurement system of claim 1, further comprising a fixture, wherein the plurality of measurement system electrical contacts are attached to the fixture, and wherein the at least one feature comprises at least one registration feature coupled to or integrated into the fixture.

11. The measurement system of claim 1, further comprising a switch network, wherein the control electronics are further configured to control the switch network to selectively connect a first measurement system electrical contact of the plurality of measurement system electrical contacts and a second measurement system electrical contact of the plurality of measurement system electrical contacts to the electrical signal source as a pair of drive electrical contacts.

12. The measurement system of claim 1, wherein
  to determine the measured voltage, the control electronics are configured to select an outlier from respective measured voltages determined at the respective pairs of measurement electrical contacts in response to the respective test electrical signals being passed through the tested material.

13. The measurement system of claim 1, further comprising a memory device, wherein the control electronics are further configured to retrieve the control voltage from the memory device, and wherein the control material is a material is in a state that does not include the defect.

14. The measurement system of claim 1, wherein the defect comprises a crack in the tested material.

15. A method for detecting a defect in a tested material, the method comprising:
  coupling a plurality of measurement system electrical contacts of a measurement system to a control material, wherein the measurement system comprises at least one feature for repeatably electrically connecting the plurality of measurement system electrical contacts to selected locations of the control material;
  causing, by control electronics, an electrical signal source of the measurement system to output a control electrical signal to be passed through the control material;
  determining, by the control electronics, a control voltage in response to the control electrical signal passed through the control material using a selected pair of measurement electrical contacts of the plurality of measurement system electrical contacts;
  decoupling the plurality of measurement system electrical contacts of the measurement system from the control material;
  after decoupling the plurality of measurement system electrical contacts of the measurement system from the control material, sequentially connect the control electronics to respective pairs of measurement electrical contacts of the plurality of measurement system electrical contacts during a time when the plurality of measurement system electrical contacts are connected to the tested material, wherein each of the plurality of measurement system electrical contacts to selected locations of the tested material;
  causing, by control electronics, the electrical signal source to output a respective test electrical signal to be passed through the tested material in response to each of the respective pairs of measurement electrical contacts being sequentially connected to the tested material;
  determining, by the control electronics, a measured voltage in response to the respective test electrical signals being passed through the tested material using one or more of the first measurement electrical contacts of the plurality of measurement system electrical contacts;
  comparing the measured voltage to the control voltage; and
  determining, by the control electronics, that the tested material includes the defect based on the comparison indicating that the measured voltage is not within a predetermined percentage of the control voltage.

16. The method of claim 15, wherein coupling the plurality of measurement system electrical contacts of the measurement system to the tested material comprises:
- coupling a first keyed measurement system electrical contact to a corresponding first keyed material electrical contact; and
- coupling a second keyed measurement system electrical contact to a corresponding second keyed material electrical contact.

\* \* \* \* \*

UNITED STATES PATENT AND TRADEMARK OFFICE
CERTIFICATE OF CORRECTION

| | |
|---|---|
| PATENT NO. | : 11,255,807 B2 |
| APPLICATION NO. | : 16/461423 |
| DATED | : February 22, 2022 |
| INVENTOR(S) | : Eric Medin Chinnock |

It is certified that error appears in the above-identified patent and that said Letters Patent is hereby corrected as shown below:

In the Specification

<u>Column 29</u>
Line 13 (approx.), in Claim 5, delete "o" after "contacts".

In the Claims

<u>Column 30</u>
Line 20, in Claim 13, delete "is" between "material" and "in a state".
Line 50-51, in Claim 15, insert --are connected-- between "electrical contacts" and "to selected locations".
Line 60, in Claim 15, delete "first" before "measurement".

Signed and Sealed this
Second Day of April, 2024

Katherine Kelly Vidal
*Director of the United States Patent and Trademark Office*